(12) United States Patent
Hashimoto et al.

(10) Patent No.: US 11,268,445 B2
(45) Date of Patent: Mar. 8, 2022

(54) GAS TURBINE AND METHOD FOR BLADE RING PRODUCTION METHOD

(71) Applicant: Mitsubishi Hitachi Power Systems, Ltd., Kanagawa (JP)

(72) Inventors: Shinya Hashimoto, Kanagawa (JP); Naoya Tatsumi, Kanagawa (JP); Hiroyuki Yamazaki, Miyagi (JP); Yuki Sugawara, Miyagi (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 109 days.

(21) Appl. No.: 16/613,275

(22) PCT Filed: May 10, 2018

(86) PCT No.: PCT/JP2018/018188
 § 371 (c)(1),
 (2) Date: Nov. 13, 2019

(87) PCT Pub. No.: WO2018/212073
 PCT Pub. Date: Nov. 22, 2018

(65) Prior Publication Data
 US 2021/0079846 A1 Mar. 18, 2021

(30) Foreign Application Priority Data
 May 16, 2017 (JP) .............................. JP2017-097523

(51) Int. Cl.
 *F01D 11/24* (2006.01)
 *F02C 7/18* (2006.01)
 *F01D 11/20* (2006.01)
(52) U.S. Cl.
 CPC ............... *F02C 7/18* (2013.01); *F01D 11/20* (2013.01); *F01D 11/24* (2013.01)

(58) Field of Classification Search
 CPC ............ F02C 7/18; F01D 11/20; F01D 11/24
 See application file for complete search history.

(56) References Cited

U.S. PATENT DOCUMENTS

| 4,526,226 A | 7/1985 | Hsia et al. |
| 8,777,559 B2 | 7/2014 | Koyabu et al. |
| (Continued) | | |

FOREIGN PATENT DOCUMENTS

| CN | 102686833 | 9/2012 |
| CN | 103925015 | 7/2014 |
| (Continued) | | |

OTHER PUBLICATIONS

International Search Report dated Jul. 3, 2018 in International (PCT) Patent Application No. PCT/JP2018/018188.
(Continued)

*Primary Examiner* — Katheryn A Malatek
(74) *Attorney, Agent, or Firm* — Wenderoth, Lind & Ponack, L.L.P.

(57) ABSTRACT

In a gas turbine, a plurality of blade ring parts each include a plurality of first cooling flow passages, a plurality of second cooling flow passages, and a return flow passage. The first cooling flow passages are disposed on the outer side in a radial direction centering on a rotation axis, extend in an axial direction, and are disposed aligned in an axial rotation direction. The second cooling flow passages are disposed on an inner side in the radial direction with respect to the first cooling flow passages, extend in the axial direction, and are disposed aligned in the axial rotation direction. The return flow passage connects end parts of each of the first cooling flow passages and the second cooling flow passages on the same side in the axial direction with each other.

18 Claims, 14 Drawing Sheets

(56) References Cited

U.S. PATENT DOCUMENTS

| | | | |
|---|---|---|---|
| 9,085,982 B2 | 7/2015 | Tsutsumi et al. | |
| 9,540,947 B2 | 1/2017 | Koyabu et al. | |
| 9,945,250 B2 | 4/2018 | Kitamura et al. | |
| 2001/0023581 A1 | 9/2001 | Ojiro et al. | |
| 2002/0071762 A1* | 6/2002 | Schroder | F01D 11/24 415/173.2 |
| 2011/0027068 A1 | 2/2011 | Floyd, II et al. | |
| 2011/0044805 A1 | 2/2011 | Koyabu et al. | |
| 2012/0247121 A1* | 10/2012 | Kitamura | F01D 25/14 60/785 |
| 2013/0243576 A1 | 9/2013 | Tsutsumi et al. | |
| 2013/0294883 A1 | 11/2013 | Ballard, Jr. et al. | |
| 2014/0234077 A1 | 8/2014 | Koyabu et al. | |
| 2016/0251962 A1* | 9/2016 | Hashimoto | F01D 5/081 60/806 |

FOREIGN PATENT DOCUMENTS

| | | |
|---|---|---|
| CN | 104053860 | 9/2014 |
| DE | 11 2014 004 738 T5 | 7/2016 |
| JP | 2001-248406 | 9/2001 |
| JP | 2013-231439 | 11/2013 |
| JP | 5457965 | 4/2014 |
| JP | 2015-078622 | 4/2015 |

OTHER PUBLICATIONS

Written Opinion of the International Searching Authority dated Jul. 3, 2018 in International (PCT) Patent Application No. PCT/JP2018/018188.

Office Action dated Sep. 2, 2021 in corresponding Chinese Patent Application No. 201880031759.2, with English Machine Translation, 21 pages.

Office Action dated Dec. 6, 2021 in corresponding German Patent Application No. 112018002535.7, with English Translation, 14 pages.

* cited by examiner

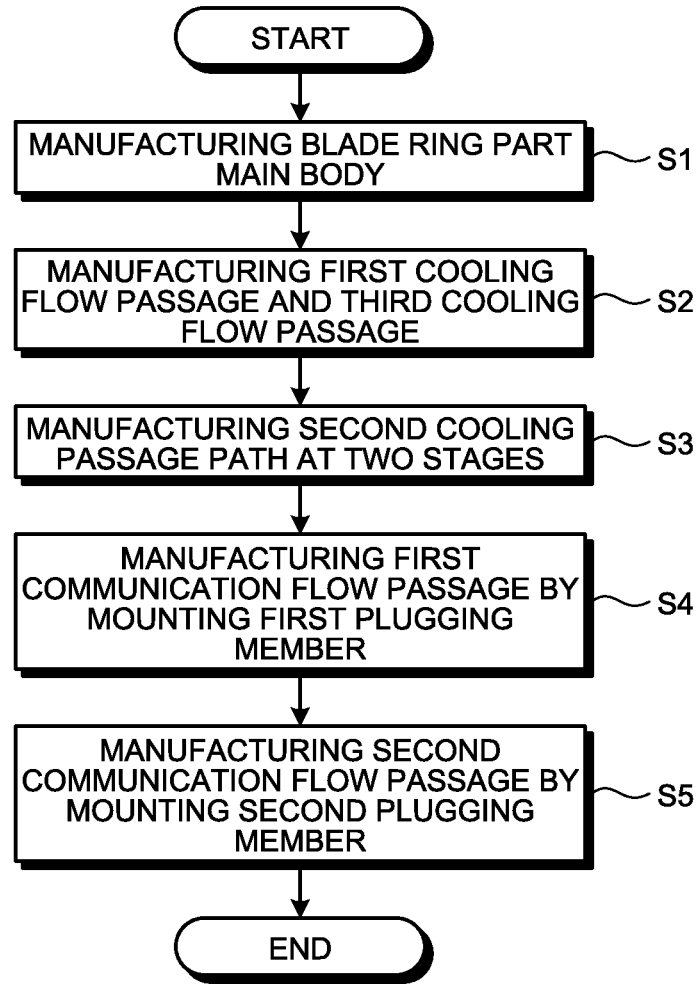

GAS TURBINE AND METHOD FOR BLADE RING PRODUCTION METHOD

FIELD

The present invention relates to a gas turbine and a method for manufacturing (producing) blade ring parts.

BACKGROUND

A gas turbine includes a compressor, a combustor, and a turbine. The compressor takes in and compresses air, and forms the air into high-temperature and high-pressure compressed air. The combustor supplies a fuel to this compressed air so as to combust the compressed air. The turbine rotates by high-temperature and high-pressure combustion gas that is generated by combustion of the compressed air. By rotation of the turbine, heat energy is converted into rotation energy.

This kind of gas turbine includes a casing for covering an outer peripheral side of a rotor, and a plurality of vane stages that are fixed to an inner peripheral side of the casing and are disposed on the respective upstream sides of a plurality of blade stages. On the inner peripheral side of the casing, a plurality of blade ring parts that are formed into an annular shape centering on the rotation axis and cover the blade stages and the vane stages are disposed. In each of the blade ring parts, a flow passage for circulating a cooling medium that cools the blade ring part is formed in an axial direction of the rotation axis (for example, see Patent Literature 1).

CITATION LIST

Patent Literature

Patent Literature 1: Japanese Patent No. 5457965

SUMMARY

Technical Problem

The gas turbine described above is required to prevent temperature distribution from being formed, in the blade ring parts, in a radial direction centering on the rotation axis.

In view of the foregoing, an object of the present invention is to provide a gas turbine capable of preventing temperature distribution from being formed in a radial direction of blade ring parts, and a method for manufacturing blade ring parts.

Solution to Problem

A gas turbine according to one aspect of the present invention includes a compressor that compresses air; a combustor that mixes a fuel with compressed air compressed by the compressor and combusts the compressed air mixed with the fuel; a turbine that rotates by combustion gas generated by the combustor; a rotor that includes a rotor main body rotating in an axial rotation direction of a rotation axis by rotation of the turbine, and a plurality of blade stages aligned in an axial direction of the rotation axis and fixed to the rotor main body; a casing that covers an outer peripheral side of the rotor; a plurality of vane stages that are fixed to an inner peripheral side of the casing and are disposed on the respective upstream sides of the blade stages; and a plurality of blade ring parts that are provided to the casing, are annularly formed centering on the rotation axis, and cover the blade stages and the vane stages. Each of the blade ring parts includes a plurality of first cooling flow passages that are disposed on an outer side in the radial direction centering on the rotation axis, extend in the axial direction, and are disposed aligned in the axial rotation direction, a plurality of second cooling flow passages that are disposed on an inner side in the radial direction away from the first cooling flow passages, extend in the axial direction, and are disposed aligned in the axial rotation direction, and a return flow passage that connects end parts of each of the first cooling flow passages and the second cooling flow passages on a same side in the axial direction with each other.

According to the present invention, a plurality of first cooling flow passages are disposed in the axial rotation direction on the outer side in the radial direction, a plurality of second cooling flow passages are disposed in the axial rotation direction on the inner side in the radial direction, and the first cooling flow passages and the second cooling flow passages are returned at end parts on the same side in the axial direction by a return flow passage. Thus, a plurality of cooling flow passages aligned in the axial rotation direction of the rotation axis can be disposed at a plurality of stages in the radial direction. In this manner, a blade ring part is cooled over a plurality of points in the radial direction so as to prevent temperature distribution from being formed in the radial direction of the blade ring part.

Further, in the gas turbine described above, the first cooling flow passages and the second cooling flow passages may be formed in a blade ring part main body, and a center of a first opening at which the second cooling flow passages are connected to the return flow passage may be disposed on an outer side in the radial direction away from a center of a second opening at which the second cooling flow passages are open to an end part of the blade ring part main body on an upstream side in the axial direction.

According to the present invention, the second cooling flow passages can be brought closer to an inner peripheral surface of a blade ring part main body, thereby further enhancing cooling of the inner peripheral surface.

Further, in the gas turbine described above, the center of the second opening may be disposed on an inner side in the radial direction away from a bottom surface directed to an inner side in the radial direction of the return flow passage.

Further, in the gas turbine described above, the second cooling flow passages may be bent flow passages that are bent outward in the radial direction at a middle point of the flow passages extending in an axial direction.

According to the present invention, a flow passage can be formed in the vicinity of an inner peripheral surface of the further inside of a cylindrical part in the blade ring part, thereby further enhancing cooling of the inner peripheral surface of the blade ring part.

Further, in the gas turbine described above, each of the blade ring parts may include a first communication flow passage that communicates the first cooling flow passages with each other in the axial rotation direction, and a second communication flow passage that communicates the second cooling flow passages with each other in the axial rotation direction.

According to the present invention, a cooling medium can be circulated in an axial rotation direction through a first communication flow passage and a second communication flow passage. Thus, temperature distribution can be prevented from being formed in an axial rotation direction of the blade ring part.

Further, in the gas turbine described above, the first communication flow passage may be connected to a supply pipe where a cooling medium is supplied, and the second communication flow passage may be connected to a discharge pipe where the cooling medium is discharged.

According to the present invention, a cooling medium flows through a supply pipe, the first communication flow passage, the first cooling flow passages, the return flow passage, the second cooling flow passages, and the second communication flow passage in order, and is discharged from a discharge pipe. Thus, the blade ring part can be efficiently cooled from the outer side to the inner side in the radial direction.

Further, in the gas turbine described above, the discharge pipe may be connected to a cooling flow passage of the combustor.

According to the present invention, a cooling medium that has cooled the blade ring part is supplied to a cooling flow passage of the combustor. Thus, the cooling medium can be efficiently used.

Further, the gas turbine described above may further include a bypass flow passage that bypasses the blade ring parts and connects the supply pipe with the discharge pipe; and a supply destination switching unit that switches a supply destination of the cooling medium between the blade ring parts and the bypass flow passage.

According to the present invention, when cooling of the blade ring part is reduced, for example, upon start-up of starting the gas turbine, a supply destination of a cooling medium is switched from the blade ring part to a bypass flow passage, thereby enabling the cooling medium to bypass the blade ring part and flow.

Further, in the gas turbine described above, the bypass flow passage may be disposed apart from a blade ring part main body in an axial direction.

According to the present invention, temperature distribution can be prevented from being generated in the blade ring part.

Further, in the gas turbine described above, the combustor may include a transition piece on the turbine side, each of the blade ring parts may include a plurality of transition piece connection units that are disposed aligned in the axial rotation direction, and each of the transition piece connection units may include a bypass connection hole that is communicated with the bypass flow passage and a communication hole on a transition piece side that is communicated with the transition piece side.

According to the present invention, a cooling medium can efficiently flow into a transition piece side through the bypass flow passage.

Further, in the gas turbine described above, the bypass flow passage may include a bypass connection pipe that is disposed in the axial rotation direction of the blade ring parts.

According to the present invention, a cooling medium can flow in an axial rotation direction of the blade ring part through a bypass connection pipe. Thus, a temperature of the cooling medium flowing into the transition piece side can be made uniform in the axial rotation direction.

Further, in the gas turbine described above, the bypass connection pipe may include a thermal expansion absorbing unit capable of being deformed depending on thermal deformation of the blade ring parts.

According to the present invention, the bypass connection pipe is deformed depending on thermal deformation of the blade ring part. Thus, deformation of the bypass flow passage can be prevented between the bypass connection pipe and a transition piece connection pipe.

Further, in the gas turbine described above, each of the blade ring parts may include a blade ring part main body provided with the first cooling flow passages, the second cooling flow passages, the return flow passage, a first groove that is a part of the first communication flow passage, and a second groove that is a part of the second communication flow passage; a first plugging member that is attachably and detachably fastened to the blade ring part main body, and plugs the first grove so as to form the first communication flow passage with the first groove; and the transition piece connection units that are attachably and detachably fastened to the blade ring part main body, and plug the second grove so as to form the second communication flow passage with the second groove.

Further, in the gas turbine described above, the blade ring parts may have a plurality of the return flow passages communicated with each other in the axial rotation direction.

According to the present invention, a cooling medium can be circulated in the axial rotation direction through the return flow passage. Thus, temperature distribution can be prevented from being formed in the axial rotation direction of the blade ring part.

Further, in the gas turbine described above, the first cooling flow passages and the second cooling flow passages may be disposed on a virtual straight line extending from the rotation axis to the radial direction.

According to the present invention, the second cooling flow passages are closely disposed on the inner side in the radial direction of the blade ring part. Thus, the inner side in the radial direction of the blade ring part can be efficiently cooled.

Further, in the gas turbine described above, each of the blade ring parts may include a cavity supply flow passage that passes through the radial direction, and the first cooling flow passages and the second cooling flow passages may be disposed at a position depending on the cavity supply flow passage.

According to the present invention, a cooling medium flowing through the first cooling flow passages and the second cooling flow passages directly cools heat input from the cavity supply flow passage side and interrupts heat transfer from the cavity supply flow passage to the inner side of the blade ring part. Thus, temperature distribution can be prevented from being generated in the blade ring part.

Further, in the gas turbine described above, each of the blade ring parts may include a partition part that projects outward in the radial direction, and the first communication flow passage may be disposed on the partition part.

According to the present invention, the blade ring part includes a partition part, thereby improving rigidity of the blade ring part, and the first communication flow passage is disposed on the inner side of the partition part, thereby preventing temperature distribution of a radial direction from being formed in a projection part. Thus, thermal deformation of the partition part can be efficiently prevented.

Further, in the gas turbine described above, each of the blade ring parts may include a plurality of third cooling flow passages that are disposed on an outer side in the radial direction away from the first cooling flow passages, extend in the axial direction, and are disposed aligned in the axial rotation direction, and a second return flow passage that connects end parts of the third cooling flow passages and the first cooling flow passages on a same side in the axial direction with each other.

According to the present invention, a plurality of cooling flow passages aligned in an axial rotation direction of a rotation axis can be disposed at three stages or more in a radial direction, thereby efficiently cooling the blade ring part over the radial direction. Thus, temperature distribution can be efficiently prevented from being formed in the radial direction of the blade ring part.

A method for manufacturing blade ring parts according to one aspect of the present invention is a method for manufacturing a plurality of blade ring parts that are provided to a cylindrical casing covering a rotor in a gas turbine, are annularly formed centering on a rotation axis of the rotor, and cover a blade stage and a vane stage. The method includes forming a blade ring part main body that includes a plurality of first cooling flow passages, a plurality of second cooling flow passages, a return flow passage, a first communication flow passage, and a second communication flow passage, the first cooling flow passages being disposed on an outer side in a radial direction centering on the rotation axis, extending in an axial direction, and being disposed aligned in an axial rotation direction, the second cooling flow passages being disposed on an inner side in the radial direction than the first cooling flow passages, extending in the axial direction, and being disposed aligned in the axial rotation direction, the return flow passage connecting end parts of each of the first cooling flow passages and the second cooling flow passages on a same side in the axial direction with each other, the first communication flow passage communicating the first cooling flow passages with each other in the axial rotation direction, and the second communication flow passage communicating the second cooling flow passages with each other in the axial rotation direction; forming the first cooling flow passages between the first communication flow passage and the return flow passage; forming the second cooling flow passages between the second communication flow passage and the return flow passage in two stages; mounting a first plugging member that plugs the first communication flow passage on the blade ring parts so as to form the first communication flow passage; and mounting a second plugging member that plugs the second communication flow passage on the blade ring parts.

According to the present invention, a first plugging member and a second plugging member are fastened to the blade ring part main body, thereby easily forming the first communication flow passage and the second communication flow passage. The first plugging member and the second plugging member are removed from the blade ring part main body, thereby enabling a first groove and a second groove to be easily exposed to the outside.

According to the present invention, the first communication flow passage includes the first groove at an end part in the axial direction, and the second communication flow passage includes the second groove at an end part in the axial direction. By attachably and detachably fastening the first plugging member to the blade ring part main body, the first groove can be plugged, and by attachably and detachably fastening the second plugging member to the blade ring part main body, the second groove may be plugged.

Advantageous Effects of Invention

The present invention can provide a gas turbine capable of preventing temperature distribution from being formed in a radial direction of blade ring parts and a method for manufacturing the blade ring parts.

BRIEF DESCRIPTION OF DRAWINGS

FIG. 14 is a flowchart illustrating a manufacturing process of the blade ring part.

DESCRIPTION OF EMBODIMENTS

Embodiments of a gas turbine and a method for manufacturing blade ring parts according to the present invention will now be described with reference to the accompanying drawings. It should be noted that the embodiments are not intended to limit this invention. Components in the following embodiments include components that can be replaced and are facilitated by the skilled person or substantially like components.

First Embodiment

Figure 1:
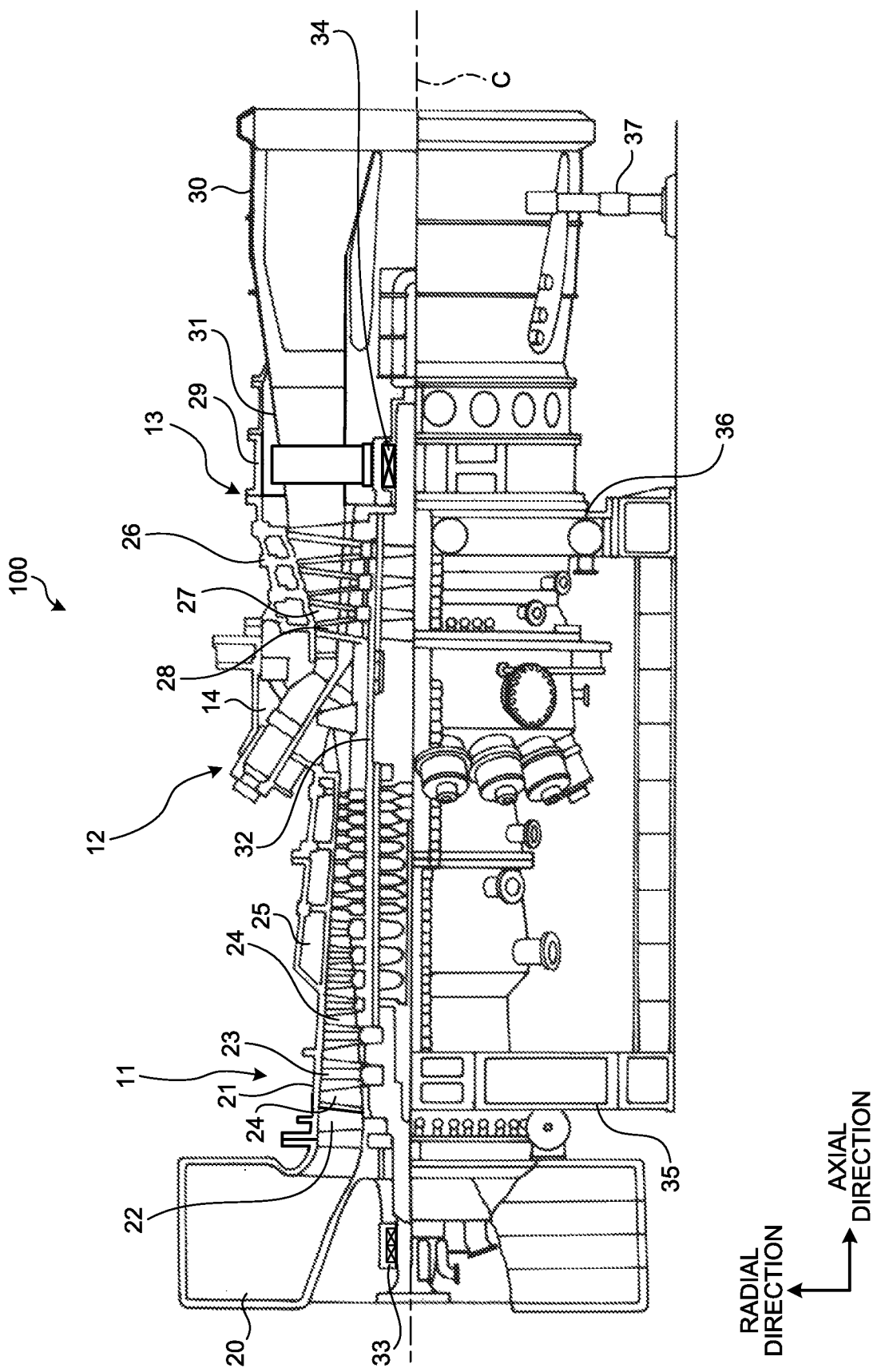
FIG. 1 is a schematic view illustrating the whole configuration of a gas turbine according to a first embodiment.

FIG. 1 is a schematic view illustrating the whole configuration of a gas turbine 100 according to the present embodiment. As illustrated in FIG. 1, the gas turbine 100 includes a compressor 11, a combustor 12, and a turbine 13. The gas turbine 100 has an unillustrated electrical generator coupled therewith, and is capable of generating electric power by the electrical generator.

The compressor 11 includes an air intake chamber 20 for taking in air, is formed by disposing an inlet guide vane (IGV) 22 in a compressor casing chamber 21 and alternately disposing a plurality of vanes 23 and a plurality of blades 24 in a flowing direction of air (axial direction of a rotor 32, which will be described later), and has an air bleed chamber 25 provided to the outside thereof. This compressor 11 compresses air taken in from the air intake chamber 20 so as to generate high-temperature and high-pressure compressed air, and supplies the compressed air to a casing chamber 14.

The combustor 12 receives high-temperature and high-pressure compressed air compressed by the compressor 11 and stored in the casing chamber 14 and fuel, and combusts the compressed air and the fuel so as to generate combustion gas. The turbine 13 has a plurality of vanes 27 and a plurality of blades 28 alternately disposed in a turbine casing chamber 26 in a flowing direction of combustion gas (axial direction of the rotor 32, which will be described later). The turbine casing chamber 26 has an exhaust chamber 30 disposed on the downstream side in a flowing direction of combustion gas through an exhaust casing chamber 29, and the exhaust chamber 30 includes an exhaust diffuser 31 coupled with the turbine 13. This turbine is driven by combustion gas from the combustor 12, and drives an electrical generator (not illustrated) coupled on the same axis.

The rotor 32 (rotation axis) 32 is disposed so that the rotor 32 passes through the compressor 11, the combustor 12, the turbine 13, and a center part of the exhaust chamber 30. The rotor 32 is rotatable in an axial rotation direction of a rotation axis C (hereinafter referred to as the "axial rotation direction"). Specifically, the rotor 32 has its end part on the compressor 11 side rotatably supported by a bearing 33 and has its end part on the exhaust chamber 30 side rotatably supported by a bearing 34. The rotor 32 is fixed by superposing a plurality of disks on which the blades 24 are each mounted in the compressor 11. The rotor 32 is also fixed by superposing a plurality of disks on which the blades 28 are each mounted in the turbine 13, and has its end part on the air intake chamber 20 side coupled with a drive axis of an electrical generator (not illustrated).

In this gas turbine 100, the compressor casing chamber 21 in the compressor 11 is supported by a leg part 35, the turbine casing chamber 26 in the turbine 13 is supported by the leg part 36, and the exhaust chamber 30 is supported by a leg part 37.

Thus, in the compressor 11, air taken in from the air intake chamber 20 is compressed passing through the IGV 22, the vanes 23, and the blades 24 so as to be high-temperature and high-pressure compressed air. In the combustor 12, a predetermined fuel is supplied to this compressed air, and the fuel and the compressed air are combusted. In the turbine 13, high-temperature and high-pressure combustion gas G generated in the combustor 12 passes through the vanes 27 and the blades 28 in the turbine 13 so as to drive and rotate the rotor 32 and drive an electrical generator coupled with this rotor 32. By contrast, after kinetic energy is converted to pressure by the exhaust diffuser 31 in the exhaust chamber 30 and is decelerated, the combustion gas G is discharged to the atmosphere. A part of the compressed air compressed by the compressor 11 is bled at a middle stage of the compressor 11, and is supplied to the turbine casing chamber 26. The bled air supplied to the turbine casing chamber 26 is stored in a turbine casing chamber space 26a, and is used for cooling high-temperature components and the like on the turbine side.

Figure 2:
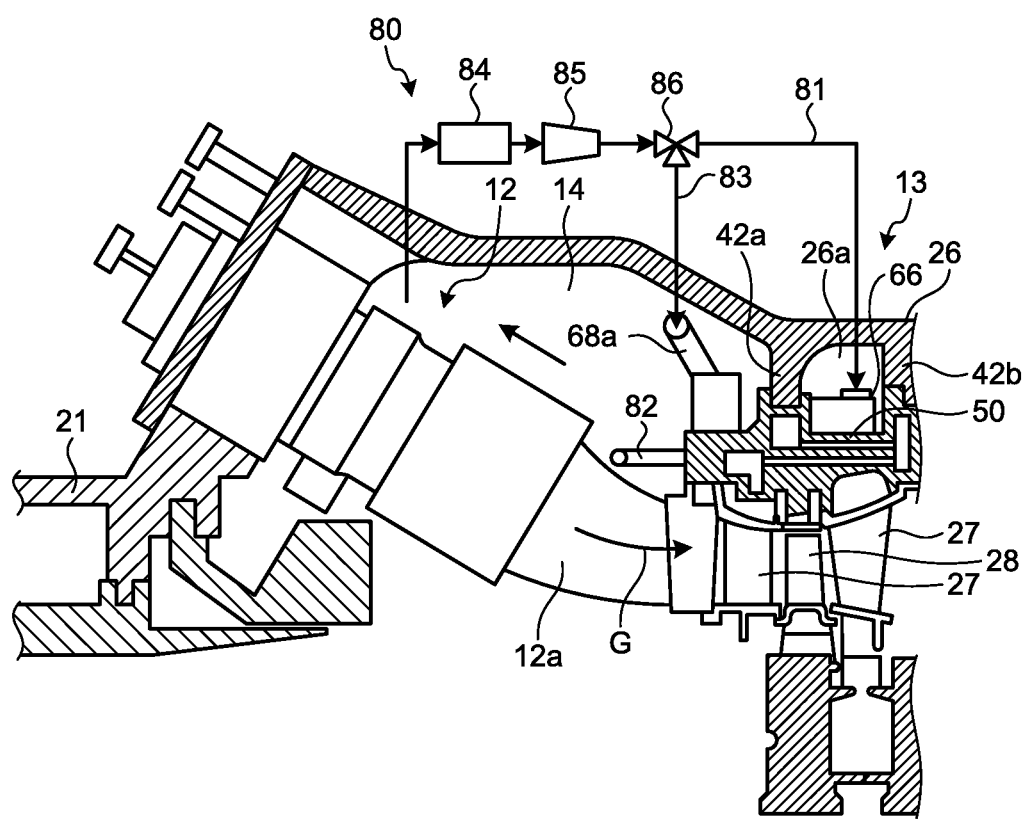
FIG. 2 is a cross-sectional view illustrating the vicinity of a blade ring part in a turbine.
Figure 3:
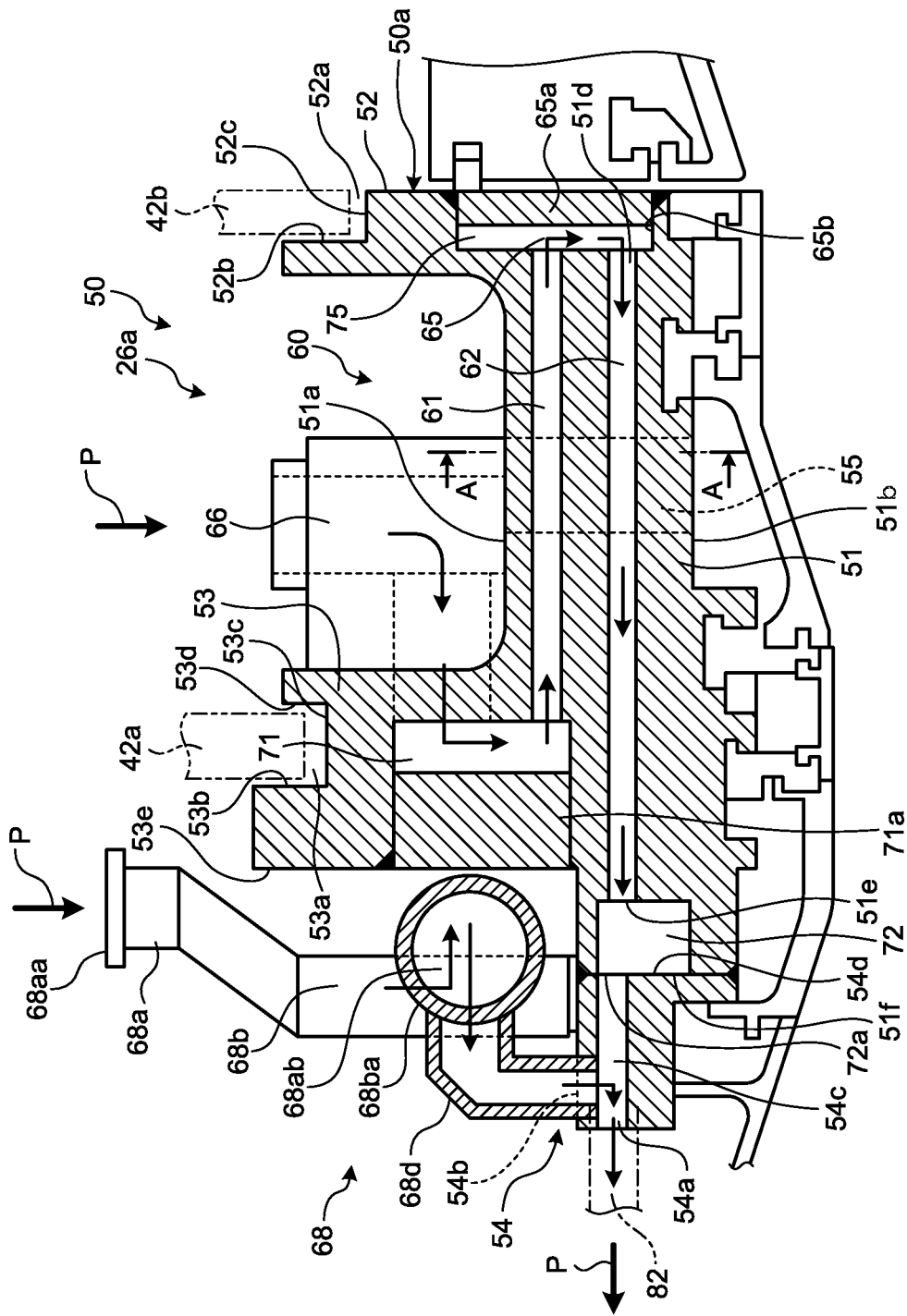
FIG. 3 is a cross-sectional view illustrating an example of the blade ring part in the turbine.

FIG. 2 is a cross-sectional view illustrating the vicinity of a blade ring part 50 in the turbine 13. FIG. 3 is a cross-sectional view illustrating an example of the blade ring part 50 in the turbine 13. As illustrated in FIGS. 2 and 3, the turbine 13 includes the cylindrical turbine casing chamber (casing) 26. The turbine casing chamber 26 has the exhaust casing chamber 29 having a cylindrical shape coupled on the downstream side in a flowing direction of the combustion gas G. The exhaust casing chamber 29 has the exhaust chamber 30 (exhaust diffuser 31) having a cylindrical shape disposed on the downstream side in a flowing direction of the combustion gas G. The exhaust chamber 30 has an exhaust duct (not illustrated) provided on the downstream side in a flowing direction of the combustion gas G.

On the inner peripheral part of the turbine casing chamber 26, an upstream-side outer partition part 42a and a downstream-side outer partition part 42b are integrally formed at a predetermined interval at the front and rear in the flowing direction of the combustion gas G. Inside this upstream-side outer partition part 42a and the downstream-side outer partition part 42b, the blade ring part 50 divided in two parts in the axial rotation direction and having a ring shape is supported. This blade ring part 50 is fastened by a bolt at a divided part in the axial rotation direction, and forms a cylindrical structure.

Figure 4:
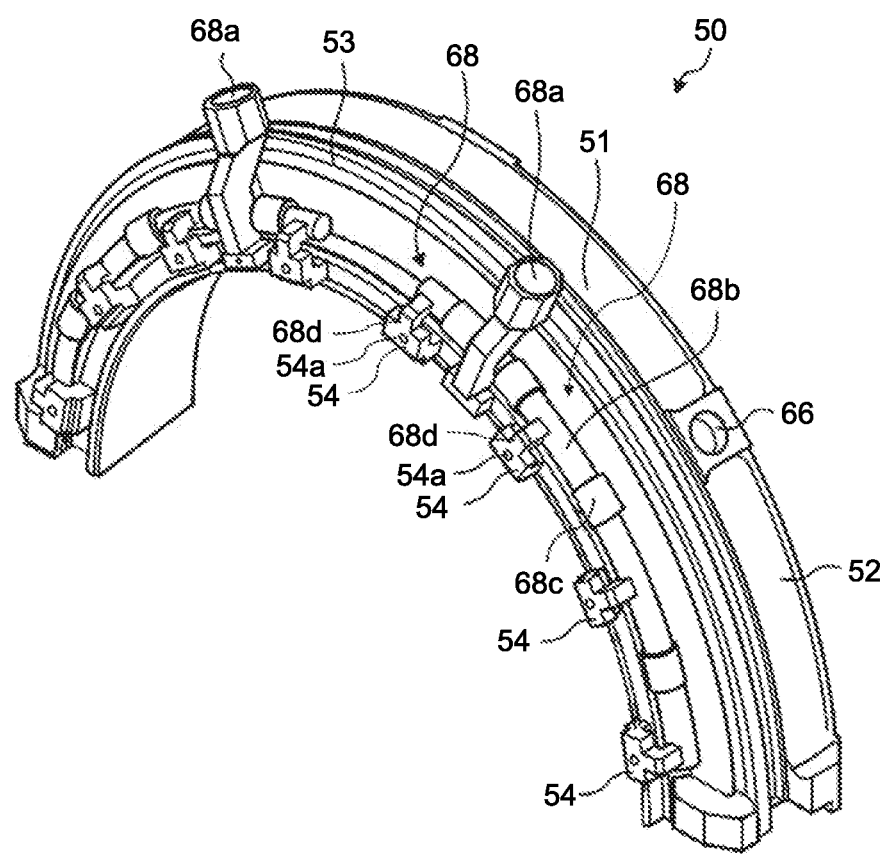
FIG. 4 is a perspective view illustrating an example of the blade ring part.

FIG. 4 is a perspective view illustrating a part of the blade ring part 50. As illustrated in FIGS. 3 and 4, the blade ring part 50 mainly includes a blade ring part main body 50a that is a main part of the blade ring part 50, a transition piece connection part 54 that forms a connection part between the combustor 12 and the blade ring part 50, and a bypass flow passage 68 that forms a flow passage in which a cooling medium P bypasses the blade ring part 50.

The blade ring part main body 50a includes a cylindrical part 51 that includes therein a cooling flow passage 60, a downstream-side inner partition part 52, and an upstream-side inner partition part 53. The cylindrical part 51 is disposed in parallel with the rotation axis C. The center axis of the cylindrical part 51 nearly coincides with the rotation axis C. The downstream-side inner partition part 52 projects from an outer peripheral surface 51a of the cylindrical part 51 to the outer side of the radial direction centering on the rotation axis C (hereinafter referred to as the "radial direction"), and is annularly provided in the axial rotation direction. In the axial direction of the rotation axis C (hereinafter referred to as the "axial direction"), the downstream-side inner partition part 52 is disposed at an end part on the downstream side in the axial direction of the turbine 13 side of the cylindrical part 51. At a corner of the end part of the downstream-side inner partition part 52, an annular end part groove 52a that has a cross section formed in an L-shape in the axial rotation direction is formed. The downstream-side outer partition part 42b formed on the inner peripheral surface of the turbine casing chamber 26 is fitted in the end part groove 52a. A side surface 52b that is directed to the downstream side in the axial direction of the downstream-side inner partition part 52 forming the end part groove 52a and a side that is directed to the upstream side in the axial direction of the downstream-side outer partition part 42b contact each other. Between the inner peripheral surface that is directed to the inner side in the radial direction of the downstream-side outer partition part 42b and the inner peripheral surface 52c that is directed to the outer side in the radial direction of the downstream-side inner partition part 52 forming the end part groove 52a, a gap for absorbing a difference in thermal expansion in the radial direction of the blade ring part main body 50a is formed. The upstream side in the axial direction indicates a direction in which the compressor 11 is viewed from the blade ring part 50, and the downstream side in the axial direction indicates a direction in which the exhaust chamber 30 is viewed from the blade ring part 50.

The upstream-side inner partition part 53 is disposed on the upstream side in the axial direction with respect to the downstream-side inner partition part 52, and projects from the outer peripheral surface 51a of the cylindrical part 51 to the outer side in the radial direction and is annularly provided in the axial rotation direction. In the upstream-side inner partition part 53, a partition groove 53a formed in the axial rotation direction is formed, and the upstream-side outer partition part 42a formed on the inner peripheral surface of the turbine casing chamber 26 is fitted. A surface that is directed to the upstream side in the axial direction of the upstream-side outer partition part 42a and a side surface 53b that is directed to the downstream side in the axial direction of the upstream-side inner partition part 53 forming the partition groove 53a contact each other, and a sealing surface is formed on the contact surface. By providing the sealing surface on the side surface 53b of the upstream-side inner partition part 53, air pressure in the casing chamber 14 is maintained. On a contact surface between the side surface 52b that is directed to the downstream side in the axial direction of the downstream-side inner partition part 52 forming the end part groove 52a and a side that is directed to the upstream side in the axial direction of the downstream-side outer partition part 42b, a pressing unit (not illustrated) such as a spring is provided. By using this pressing unit for pressing the blade ring part 50 to the upstream side in the axial direction through the side surface 52b, air in the casing chamber is prevented from leaking from a gap generated on the sealing surface of the upstream-side inner partition part 53 into turbine casing chamber space 26a on the downstream side in the axial direction.

In addition, between the inner peripheral surface that is directed to the inner side in the radial direction of the upstream-side outer partition part 42a and the inner peripheral surface 53c that is directed to the outer side in the radial direction of the upstream-side inner partition part 53 forming the partition groove 53a, a gap for absorbing a difference in thermal expansion in the radial direction of the turbine casing chamber 26 and the blade ring part main body 50a is formed. Similarly, between a side surface that is directed to the downstream side of the axial direction of the upstream-side outer partition part 42a and a side surface 53d that is directed to the upstream side of the axial direction of the upstream-side inner partition part 53 forming the partition groove 53a, a gap for absorbing a difference in thermal expansion in the axial direction of the turbine casing chamber 26 and the blade ring part main body 50a is formed.

The blade ring part main body 50a includes the cooling flow passage 60 in which the cooling medium P flows. The cooling flow passage 60 includes a first cooling flow passage 61 that cools the cylindrical part 51, a second cooling flow passage 62 that is disposed on the downstream side in a flowing direction of the cooling medium P in the first cooling flow passage 61, and a return flow passage 65 that connects the first cooling flow passage 61 with the second cooling flow passage 62. The first cooling flow passage 61 is disposed on the outer side in the radial direction of the cylindrical part 51, and is disposed in proximity to an outer peripheral surface 51b of the cylindrical part 51a. The first cooling flow passage 61 extends almost in parallel with the axial direction. A plurality of the first cooling flow passages 61 are disposed aligned in the axial rotation direction.

The second cooling flow passage 62 is disposed on the inner side in the radial direction away from the first cooling flow passage 61 in the cylindrical part 51, and is disposed in proximity to the inner peripheral surface 51b of the cylindrical part 51. The second cooling flow passage 62 linearly extends almost in parallel with the axial direction. Thus, the second cooling flow passage 62 is almost parallel to the first cooling flow passage 61. A plurality of the second cooling flow passages 62 are disposed aligned in the axial rotation direction.

The return flow passage 65 connects end parts of the first cooling flow passage 61 and the second cooling flow passage 62 on the same side in the axial direction with each other. The return flow passage 65 is disposed on an end part of the downstream side in the axial direction of the blade ring part main body 50a. The return flow passage 65 is a flow passage for returning the cooling medium P flowing in the first cooling flow passage 61 to the second cooling flow passage 62. As illustrated in FIG. 3, the return flow passage 65 has a cross sectional shape on a plane surface passing through the rotation axis C that is a rectangular shape (cavity) extending on the outer side in the radial direction.

The first cooling flow passage 61 is connected on the outer side in the radial direction of the return flow passage 65, and the second cooling flow passage 62 is connected on the inner side in the radial direction thereof. The return flow passage 65 (return communication flow passage 75) may be annularly formed along with the axial rotation direction. Thus, the return flow passage 65 communicates the first cooling flow passages 61 with the second cooling flow passages 62 in the axial rotation direction. When the return flow passage 65 (return communication flow passage 75) is annularly formed along with the axial rotation direction, the whole downstream-side inner partition part 52 is cooled. Thus, an upper end in the radial direction of a rectangular cross section of the return flow passage 65 is preferably formed in proximity to the inner peripheral surface 52c of the downstream-side inner partition part 52.

The blade ring part 50 may include a communication flow passage 70 that supplies the cooling medium P to a plurality of the cooling flow passages 60 annularly disposed in the axial rotation direction of the blade ring part 50 or collects the cooling medium P from the cooling flow passages 60, and is communicated with each of the cooling flow passages 60 in the axial rotation direction. The communication flow passage 70 includes a first communication flow passage 71 and a second communication flow passage 72. The first communication flow passage 71 communicates the first cooling flow passages 61 aligned in the axial rotation direction with each other in the axial rotation direction. The first communication flow passage 71 is provided to the inside of the upstream-side inner partition part 53. As illustrated in FIG. 3, the first communication flow passage 71 has a cross sectional shape on a plane surface passing through the rotation axis C that is a rectangular shape extending on the outer side in the radial direction. Thus, in the upstream-side inner partition part 53, the cooling medium P can be circulated even on the outer side in the radial direction. The first communication flow passage 71 is connected to a supply pipe 81 (which will be described later) in which the cooling medium P is supplied through an intake flow passage 66. In order to cool the whole upstream-side inner partition part 53, the first communication flow passage 71 preferably has a cross sectional shape that is a rectangular cross sectional shape having a flow passage width in the radial direction wider than a flow passage width in the axial direction and having a narrow flow passage width extending in the radial direction. In addition, the upper end in the radial direction of the rectangular cross section is preferably formed in proximity to the inner peripheral surface 53c of the upstream-side inner partition part 53.

The second cooling flow passage 62 is connected to a flow passage opening (second opening) 51e that is formed on an internal wall of the second communication flow passage 72 formed on an end part on the upstream side in the axial direction of the blade ring part main body 50a. An end part on the downstream side in the axial direction of the second cooling flow passage 62 is connected to a flow passage opening (first opening) 51d that is provided to the return flow passage 65 or the return communication flow passage 75. The second cooling flow passage 62 may be a flow passage that is not parallel to the first cooling flow passage 61 and is inclined on the inner side in the radial direction while being directed to the upstream side in the axial direction. In this case, the center of the flow passage opening 51d is formed on the outer side in the radial direction away from the center of the flow passage opening 51e. In addition, the center of the flow passage opening 51e may be formed on the inner side in the radial direction than a bottom surface 65b on the inner side in the radial direction of the return flow passage 65 or the return communication flow passage 75. When being inclined to the inner side in the radial direction, the second cooling flow passage 62 is disposed further in proximity to the inner peripheral surface 51b side of the cylindrical part 51 so as to further enhance the cooling of the inner peripheral surface 51b.

The second communication flow passage 72 communicates the second cooling flow passages 62 aligned in the axial rotation direction with each other in the axial rotation direction. The second communication flow passage 72 is provided, for example, on the upstream side in the axial direction than the upstream-side inner partition part 53 in the cylindrical part 51 and on the inner side of the cylindrical part 51 projecting to the combustor 12 side. The second communication flow passage 72 is disposed on the inner side in the radial direction away from the first communication flow passage 71 in proximity to the inner peripheral surface 51b of the cylindrical part 51.

The second communication flow passage 72 has a cross section that is formed on a main body upstream-side end surface 51f on the upstream side in the axial direction of the cylindrical part 51 and is recessed from the main body upstream-side end surface 51f to the downstream side in the axial direction, and the cross section is formed as an annular groove-like communication opening 72a that extends in the axial rotation direction. The second communication flow passage 72 has the second cooling flow passages 62 connected thereto through the flow passage opening 51e. The second communication flow passage 72 is connected to a discharge flow passage 54c of the transition piece connection part 54 disposed adjacent to the main body upstream-side end surface 51f on the upstream side in the axial direction.

As illustrated in FIGS. 3 and 4, the transition piece connection part 54 is disposed on the downstream side in the axial direction depending on the number of the installed combustors 12, and is disposed adjacent to the upstream side in the axial direction of the cylindrical part 51 of the blade ring part main body 50a. The transition piece connection part 54 is a box-like plugging member fixed to the main body upstream-side end surface 51f at the upstream end in the axial direction of the cylindrical part 51 of the blade ring part main body 50a. A plurality of the transition piece connection parts 54 are disposed on the downstream side in the axial direction adjacent to a transition piece 12a of the combustors 12 disposed on the upstream side in the axial direction of the blade ring part main body 50a, and are disposed aligned in the axial rotation direction. Each of the transition piece connection parts 54 includes a communication hole on the transition piece side 54a that is communicated with a cooling flow passage (not illustrated) formed on the transition piece 12a (see FIG. 2) side through a discharge pipe 82, a bypass connection hole 54b to which the bypass flow passage (which will be described later) is connected, and the discharge flow passage 54c that is connected to the second communication flow passage 72, collects the cooling medium P after cooling the cooling flow passage 60, and is connected to the communication hole on the transition piece side 54a. The discharge flow passage 54c is a flow passage that extends on the upstream side in the axial direction, and is connected to the discharge pipe 82 through the communication hole on the transition piece side 54a formed at the upstream end in the axial direction of the transition piece connection part 54. The discharge pipe 82 is connected to a cooling flow passage (not illustrated) of the combustor 12. The discharge flow passage 54c is connected to a bypass pipe 83 through the bypass flow passage 68 (which will be described later). The cooling medium P that bypasses the blade ring part main body 50a and is supplied to the bypass pipe 83 is supplied to the bypass flow passage 68, and is discharged from the discharge flow passage 54c to the discharge pipe 82.

The following describes a bypass flow passage in which the cooling medium P bypasses the blade ring part without flowing into the blade ring part upon start-up of the gas turbine with reference to FIGS. 2, 3, and 4. Upon start-up of the gas turbine 100, the blades 28 are displaced outward in the radial direction after displacement along with high-speed rotation and displacement due to heat input from combustion gas overlap with each other. By contrast, upon start-up, when the cooling medium P is supplied to the blade ring part 50 without bypassing the blade ring part 50, the blade ring part 50 is cooled by the cooling medium P flowing in the blade ring part 50 and is displaced to the inner side in the radial direction. After the displacement, in a transition period before the gas turbine 100 reaches rated operation, clearance between the front end portion of the blades 28 and the blade ring part 50 may be smaller than a proper value. In order to avoid this phenomenon, upon start-up of the gas turbine 100, the cooling medium P preferably bypasses the blade ring part 50 without passing through the blade ring part 50 and the cooling medium P is preferably supplied to the blade ring part 50 during the rated operation. In this manner, in the operation transition period of the gas turbine 100, displacement of the blade ring part 50 to the inner side in the radial direction due to the cooling medium P is reduced. By contrast, the blade ring part 50 is warmed by bleed air in a process when a part of the bleed air from the compressor 11 passes through a cavity supply flow passage 55. In this manner, clearance can be prevented from being too small. Thus, proper clearance can be defined so as to shorten a start-up time of the gas turbine 100 and improve efficiency of the gas turbine 100.

The bypass flow passage 68 is formed of a bypass inlet pipe 68a that receives the cooling medium P from a cooling medium circulation mechanism 80 (details will be described later), a bypass connection pipe 68b that is annularly disposed in the axial rotation direction on the upstream side in the axial direction of the cylindrical part 51 and supplies the cooling medium P to the transition piece connection part 54, a thermal expansion absorbing unit 68c that absorbs thermal expansion in the axial rotation direction of the bypass connection pipe 68b, and an inlet connection pipe 68d that couples the bypass connection pipe 68b with the bypass connection hole 54b formed on the transition piece connection part 54.

In the example illustrated in FIG. 4, the cylindrical bypass inlet pipe 68a is formed at two points in the axial rotation direction with respect to an upper half part of the one blade ring part 50a. The bypass inlet pipe 68a includes an opening 68aa connected to the cooling medium circulation mechanism 80 on the outer side in the radial direction, and an opening 68ab connected to the bypass connection pipe 68b on the inner side in the radial direction. The opening 68ab is connected to an opening 68ba formed on the outer peripheral surface of the bypass connection pipe 68b. A part of the bypass connection pipe 68b bites into the bypass inlet pipe 68a from a direction orthogonal to the bypass inlet pipe 68a, and a part of the bypass inlet pipe 68a and a part of the bypass connection pipe 68b are joined so as to pass through each other. The bypass inlet pipe 68a and the bypass connection pipe 68b are communicated with each other through the opening 68*ab* of the bypass inlet pipe 68*a* and the opening 68*ba* formed on the bypass connection pipe 68*b*.

The bypass connection pipe 68*b* is annularly disposed in the axial rotation direction along with an outer surface on the outer side in the radial direction of the transition piece connection part 54, and is fixed to the transition piece connection part 54. The bypass connection pipe 68*b* is, in proximity to a side surface 53*e* directed to the upstream side in the axial direction of the upstream-side inner partition part 53, disposed on the upstream side in the axial direction, but the bypass connection pipe 68*b* and the side surface 53*e* are disposed apart from each other without contacting each other. The reason why the bypass connection pipe 68*b* and the side surface 53*e* are apart from each other is to prevent the blade ring part main body 50*a* from being cooled by the cooling medium P flowing in the bypass flow passage 68 and prevent temperature distribution from being generated in the blade ring part main body 50*a*.

As described above, the bypass connection pipe 68*b* stretching in the axial rotation direction is connected to a plurality of the bypass inlet pipe 68*a* and the inlet connection pipe 68*d* coupled with the transition piece connection parts 54. The bypass connection pipe 68*b* is formed of a plurality of connection pipes. On both sides in the axial rotation direction of the bypass connection pipe 68*b* sandwiching the bypass inlet pipes 68*a* and the inlet connection pipe 68*d*, the thermal expansion absorbing unit 68*c* for absorbing thermal expansion of the bypass connection pipe 68*b* in the axial rotation direction is disposed. A bellows, a U-shaped pipe deformed in the axial direction, or the like can be employed as an example of the thermal expansion absorbing unit 68*c*, but the thermal expansion absorbing unit 68*c* is not limited to this example. The reason why the thermal expansion absorbing unit 68*c* is provided is that the bypass inlet pipes 68*a* and the transition piece connection parts 54 are fixed to the blade ring part main body 50*a*, and the point at which the bypass connection pipe 68*b* is connected to the bypass inlet pipes 68*a* and the inlet connection pipe 68*d* cannot absorb thermal expansion in the axial rotation direction of the bypass connection pipe 68*b*.

One end part of the inlet connection pipe 68*d* is communicated with the bypass connection pipe 68*b*, and the other end part thereof is communicated with the discharge flow passage 54*c* formed on the transition piece connection part 54 through the bypass connection hole 54*b*.

Figure 5:
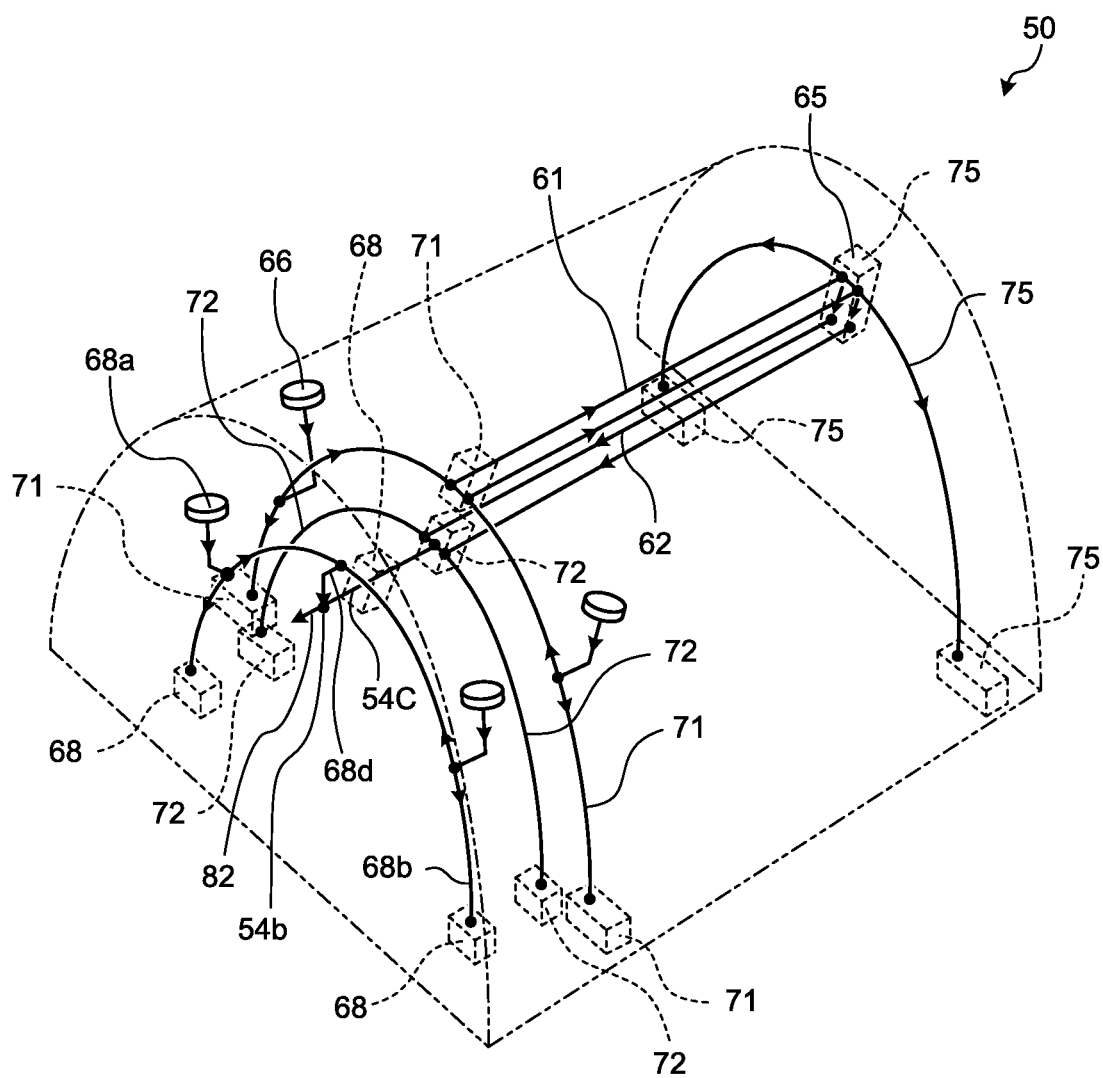
FIG. 5 is a systematic view illustrating cooling flow passages of the blade ring part.

FIG. 5 is a systematic view illustrating a flow of the cooling flow passage 60 of the blade ring part 50. As described above, the first cooling flow passage 61 disposed on the outer peripheral surface side of the cylindrical part 51 in the blade ring part 50 is connected to the first communication flow passage 71 annularly formed in the axial rotation direction on the upstream side in the axial direction, and is connected to the return communication flow passage 75 annularly formed in the axial rotation direction on the downstream side in the axial direction. In addition, the cooling medium P flowing into the return communication flow passage 75 is returned inward in the radial direction in the return communication flow passage 75, and flows into the second cooling flow passage 62. The second cooling flow passage 62 is disposed on the inner side in the radial direction of the first cooling flow passage 61, and is disposed in proximity to the inner peripheral surface of the cylindrical part 51 in the blade ring part 50. The second cooling flow passage 62 is disposed in parallel with the first cooling flow passage 61 along with the axial direction, is connected to the return communication flow passage 75 annularly formed in the axial rotation direction on the downstream side in the axial direction, and is connected to the second communication flow passage 72 on the upstream side in the axial direction.

The example illustrated in FIG. 5 is an example in which the two first cooling flow passages 61 and the two second cooling flow passages 62 are disposed as one set. At the front and rear in the axial rotation direction of a set of the cooling flow passages combining the first cooling flow passages 61 with the second cooling flow passages 62, the cavity supply flow passage 55 (FIG. 7), which will be described later, is disposed in proximity so as to sandwich the set of the cooling flow passages in the axial rotation direction. In addition, a plurality of the sets for the cooling flow passages each formed of the two first cooling flow passages 61 and the two second cooling flow passages 62 aligned in parallel in the axial rotation direction, which are not illustrated in FIG. 5, are disposed corresponding to the positions of a plurality of the cavity supply flow passages 55 disposed in the axial rotation direction.

The first communication flow passage 71 includes a plurality of the intake flow passages 66 connected to the cooling medium circulation mechanism 80. The second communication flow passage 72 is connected to the discharge flow passage 54*c* extending on the upstream side in the axial direction. A plurality of the discharge flow passages 54*c* are disposed in the axial rotation direction corresponding to the position of the transition piece 12*a* in the combustor 12, and are connected to the discharge pipe 82 on the upstream side in the axial direction.

The bypass flow passage 68 is disposed on the outer side in the radial direction with respect to the discharge flow passage 54*c*, and is annularly formed in the axial rotation direction. The bypass flow passage 68 includes a plurality of the bypass inlet pipes 68*a* connected to the cooling medium circulation mechanism 80. The bypass flow passage 68 is equipped with the annularly formed bypass connection pipe 68*b*, and includes the inlet connection pipe 68*d* that is connected corresponding to the position of the axial rotation direction of the transition piece connection part 54 and is connected to the bypass connection pipe 68*b* and the transition piece connection part 54.

Figure 6:
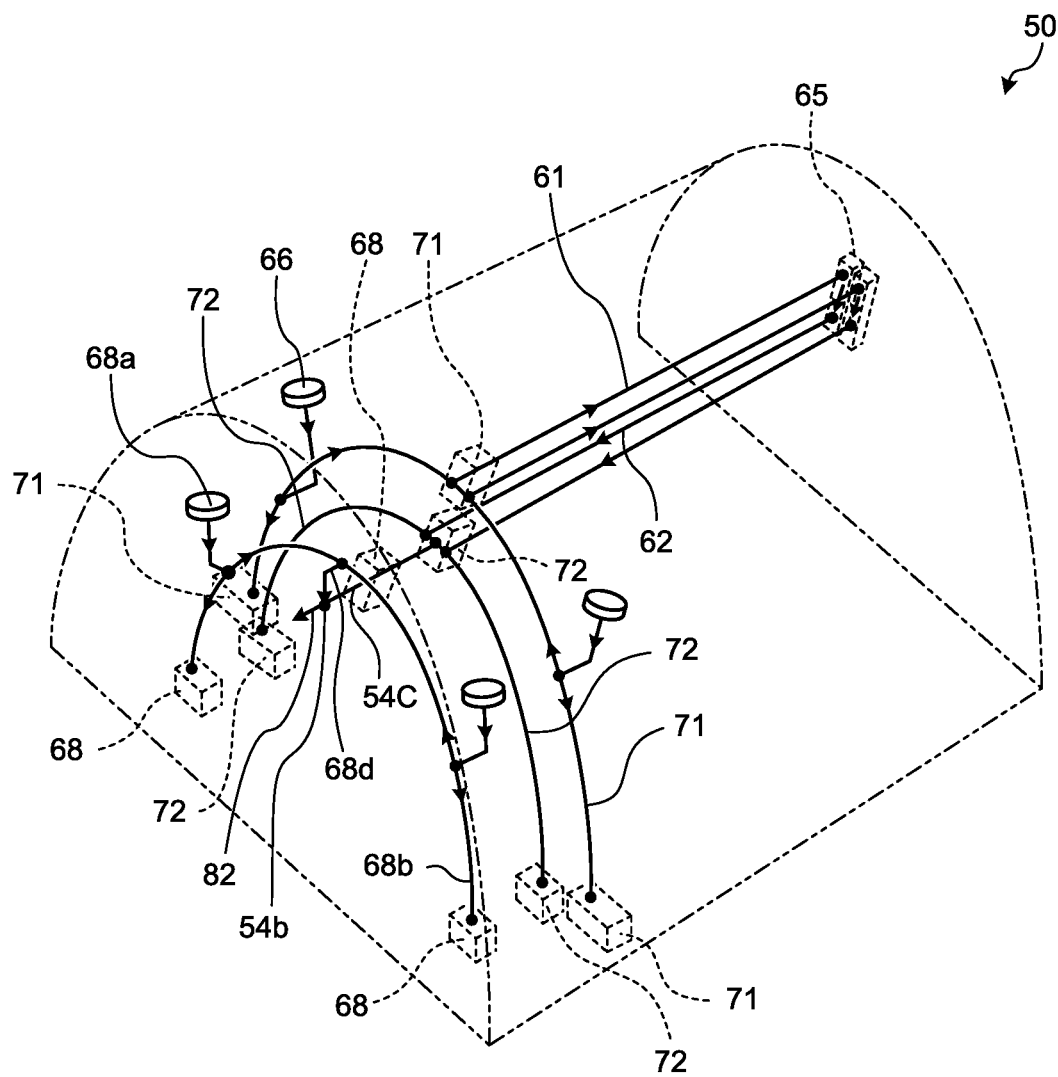
FIG. 6 is a systematic view illustrating a modification of the cooling flow passages of the blade ring part.

FIG. 6 is a systematic view illustrating a modification of a flow of the cooling flow passage 60 according to the present embodiment. In other words, the cooling flow passage 60 illustrated in FIG. 6 is an example in which the return communication flow passage 75 is omitted from the cooling flow passage 60 illustrated in FIG. 5. The present modification includes, on the downstream side in the axial direction of the cylindrical part 51, the return flow passage 65 that is formed as a rectangular space (cavity) extending long in the radial direction. The first cooling flow passage 61 is connected to the return flow passage 65 on the outer side in the radial direction. The second cooling flow passage 62 is connected to the return flow passage 65 on the inner side in the radial direction. A plurality of the return flow passages 65 are radially disposed centering on the rotation axis C corresponding to the position of a set of the first cooling flow passages 61 and the second cooling flow passages 62 disposed in the axial rotation direction. The other cooling flow passage 60 is formed using the same configuration as that in the first embodiment.

Figure 7:
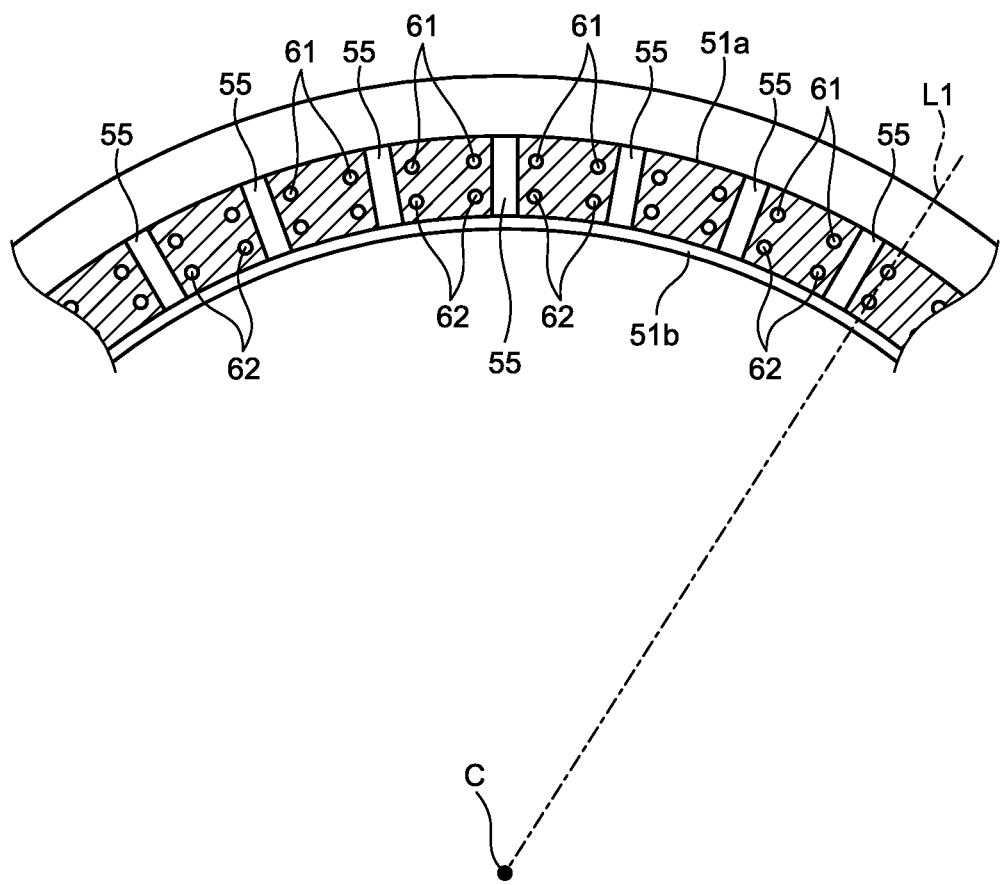
FIG. 7 is a view illustrating the configuration along with a cross section along A-A in FIG. 3.

FIG. 7 is a view illustrating the configuration along with a cross section along A-A in FIG. 3. As illustrated in FIG. 7, the first cooling flow passages 61 and the second cooling flow passages 62 are disposed on a virtual straight line L1 extending from the rotation axis C to the radial direction. The blade ring part 50 includes the cavity supply flow passages 55 passing through the radial direction. The first cooling flow passages 61 and the second cooling flow passages 62 are disposed at the positions corresponding to the cavity supply flow passages 55. In the present embodiment, the first cooling flow passages 61 and the second cooling flow passages 62 are disposed in proximity so that the first cooling flow passages 61 and the second cooling flow passages 62 are sandwiched on both sides of the cavity supply flow passages 55 in the axial rotation direction. The upstream side of the cavity supply flow passages 55 is communicated with the turbine casing chamber space 26a. A part of bleed air supplied to the turbine casing chamber space 26a described above flows into the cavity supply flow passages 55 and is used for cooling high-temperature components such as the vanes 27. In other words, a temperature of compressed air flowing into the cavity supply flow passages 55 is higher than that of the cooling temperature P supplied to the cooling flow passage 60 in the blade ring part 50. This configuration causes heat transferred from a side of compressed air flowing into the cavity supply flow passages 55 to the blade ring part 50 to be directly cooled by the cooling medium P flowing into the first cooling flow passages 61 and the second cooling flow passages 62. After the cooling, heat transfer from the cavity supply flow passages 55 to the inner side of the blade ring part 50 is stopped, and temperature distribution is prevented from being generated in the blade ring part 50.

The cooling medium P supplied to the blade ring part 50 is supplied from the cooling medium circulation mechanism 80 independently provided as illustrated in FIG. 2. The cooling medium circulation mechanism 80 includes an air-cooler 84, a compressor 85, and a three-way valve (supply destination switching unit) 86. The air-cooler 84 takes in and cools air in a casing chamber (cooling medium P) around the combustor 12, and delivers the air to the compressor 85. The compressor 85 compresses the air from the air-cooler 84 and delivers the compressed air to the three-way valve 86. The three-way valve 86 is connected to the compressor 85, the supply pipe 81, and the bypass pipe 83 described above. The supply pipe 81 is connected to the intake flow passage 66 in the blade ring part 50, and the bypass pipe 83 is connected to the bypass inlet pipe 68a. The three-way valve 86 can supply the air from the compressor 85 by switching between the supply pipe 81 and the bypass pipe 83. Thus, in case of the steady operation of the gas turbine 100, for supplying the cooling medium P to the blade ring part 50, the three-way valve 86 is switched so as to make the cooling medium P flow into the supply pipe 81 side. Upon start-up of the gas turbine 100, supplying the cooling medium P to the blade ring part 50 is not necessary, and the three-way valve 86 is switched so as to make the cooling medium P flow into the bypass pipe 83 side.

In the blade ring part 50 formed as above, the cooling medium P supplied from the supply pipe 81 pours into the blade ring part main body 50a. The cooling medium P pouring into the blade ring part main body 50a flows along with the cooling flow passage 60 and the communication flow passage 70, and absorbs heat of the blade ring part main body 50a and is discharged from the discharge pipe 82.

Specifically, the cooling medium P taken into the blade ring part main body 50a is supplied to the first communication flow passage 71 through the intake flow passage 66. The cooling medium P flows in the first communication flow passage 71 in the axial rotation direction, and is supplied to the whole first communication flow passage 71 in the axial rotation direction. In addition, the cooling medium P flows from the first communication flow passage 71 to the first cooling flow passages 61. This cooling medium P flows in the first cooling flow passages 61 along with the axial direction to the turbine 13 side, and is supplied to the return flow passage 65 (return communication flow passage 75).

The cooling medium P supplied to the return communication flow passage 75 flows into the return communication flow passage 75 in the axial rotation direction. In case of a modification of the first embodiment where the return communication flow passage 75 is not included as illustrated in FIG. 6, the cooling medium P supplied to the return flow passage 65 flows into the radial direction along with the return flow passage 65, and is supplied to the second cooling flow passages 62.

The cooling medium P supplied to the second cooling flow passages 62 flows in the second cooling flow passages 62 along with the axial direction to the combustor 12 side, and is supplied to the second communication flow passage 72. In this manner, in the blade ring part 50, the first cooling flow passages 61 and the second cooling flow passages 62 disposed aligned in the radial direction each have an opposed flow passage in which the cooling medium P flows in an opposite direction to the axial direction formed thereon. Thus, in the blade ring part 50, a flow of the cooling medium P is formed in the radial direction at a plurality of stages.

The cooling medium P supplied to the second communication flow passage 72 flows into the second communication flow passage 72 in the axial rotation direction, and is supplied to the whole second communication flow passage 72 in the axial rotation direction. In addition, the cooling medium P is discharged from the second cooling flow passages 62, and is collected in the second communication flow passage 72 and flows into the discharge flow passage 54c. This cooling medium P flows into the discharge pipe 82 from the discharge flow passage 54c, and is supplied to a cooling flow passage (not illustrated) of the combustor 12.

Upon start-up of the gas turbine, the cooling medium P is not supplied to the blade ring part main body 50a, and flows into the bypass flow passage 68 and is discharged to the discharge pipe 82 through the discharge flow passage 54c. At that time, the bypass flow passage 68 does not contact the blade ring part main body 50a. Thus, upon start-up of the gas turbine, the blade ring part main body 50a is cooled by the bypass flow passage 68, and there is no possibility of forming temperature distribution in the blade ring part main body 50a.

The following describes a manufacturing process of the blade ring part 50 of the present embodiment. The blade ring part main body 50a is produced by casting, sheet-metal working, or the like. In this process, in the cylindrical part 51 and the upstream-side inner partition part 53 forming the blade ring part main body 50a, the first communication flow passage 71 and the return flow passage 65 (return communication flow passage 75) disposed at the end of the axial direction to which each cooling flow passage is connected are formed as annular grooves in the axial rotation direction by mechanical processing. Subsequently, the first cooling flow passages 61 and the second cooling flow passages 62 are formed by mechanical processing using drilling. The first cooling flow passages 61 are drilled from the return flow passage 65 (return communication flow passage 75) side toward the first communication flow passage 71 side. The second cooling flow passages 62 are drilled from the return flow passage 65 (return communication flow passage 75) side toward the second communication flow passage 72 side, and are open at the flow passage opening 51e formed on the second communication flow passage. Subsequently, a first plugging member (lid plate 71a) and a second plugging member (transition piece connection part 54), and a lid plate 65a are mounted on the blade ring part main body 50a by welding processing so as to form the first communication flow passage 71 and the second communication flow passage 72, and the return flow passage 65 (return communication flow passage 75) that are closed flow passages. Subsequently, the bypass flow passage 68 is mounted on the transition piece connection part 54 fixed to the blade ring part main body 50a. Through this manufacturing process, assembly of the blade ring part 50 is completed.

As above, the gas turbine 100 according to the present embodiment has, in the blade ring part 50, a plurality of the first cooling flow passages 61 disposed in the axial rotation direction on the outer side in the radial direction and a plurality of the second cooling flow passages 62 disposed in the axial rotation direction on the inner side in the radial direction. In addition, the first cooling flow passages 61 and the second cooling flow passages 62 are returned at end parts on the same side in the axial direction by the return flow passage 65. In this manner, a plurality of the cooling flow passages 60 aligned in the axial rotation direction can be disposed at a plurality of stages in the radial direction. Thus, the blade ring part 50 is cooled over a plurality of points in the radial direction so as to prevent temperature distribution from being formed in the radial direction of the blade ring part 50.

Second Embodiment

Figure 8:
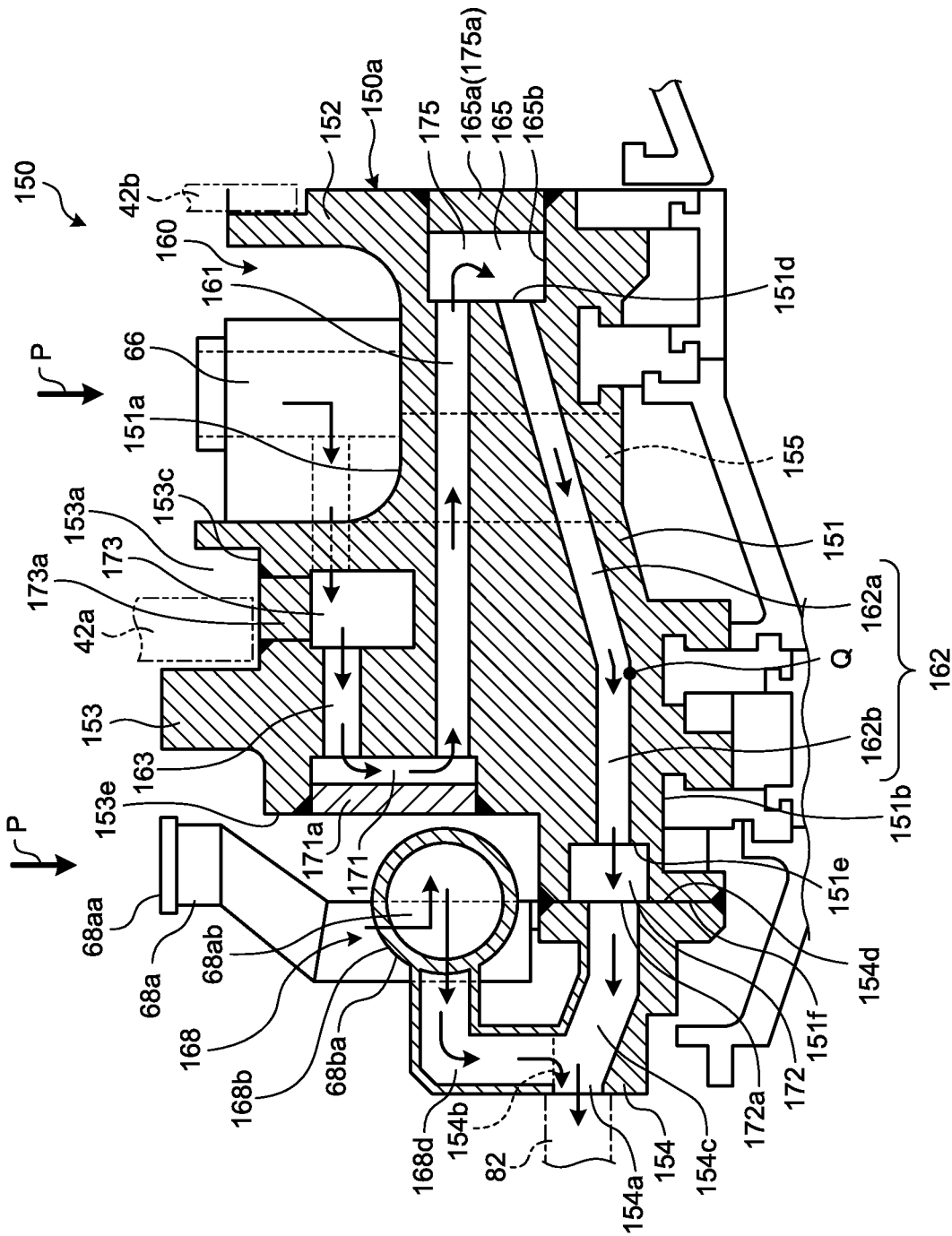
FIG. 8 is a cross-sectional view illustrating an example of a blade ring part according to a second embodiment.
Figure 9:
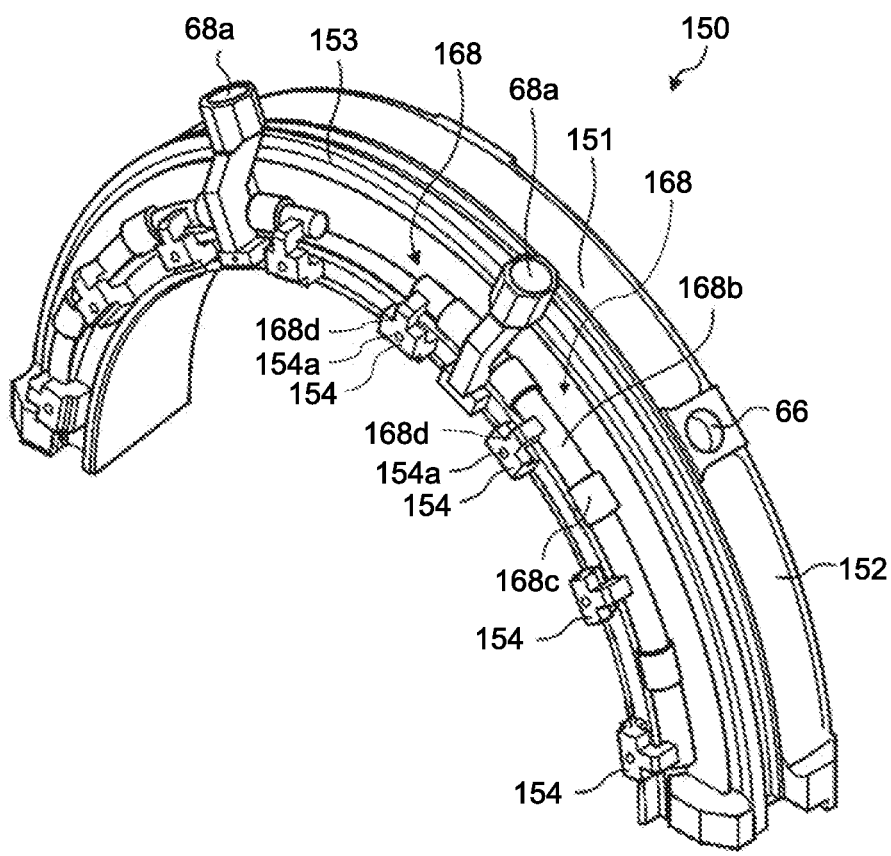
FIG. 9 is a perspective view illustrating an example of a part of the blade ring part.
Figure 10:
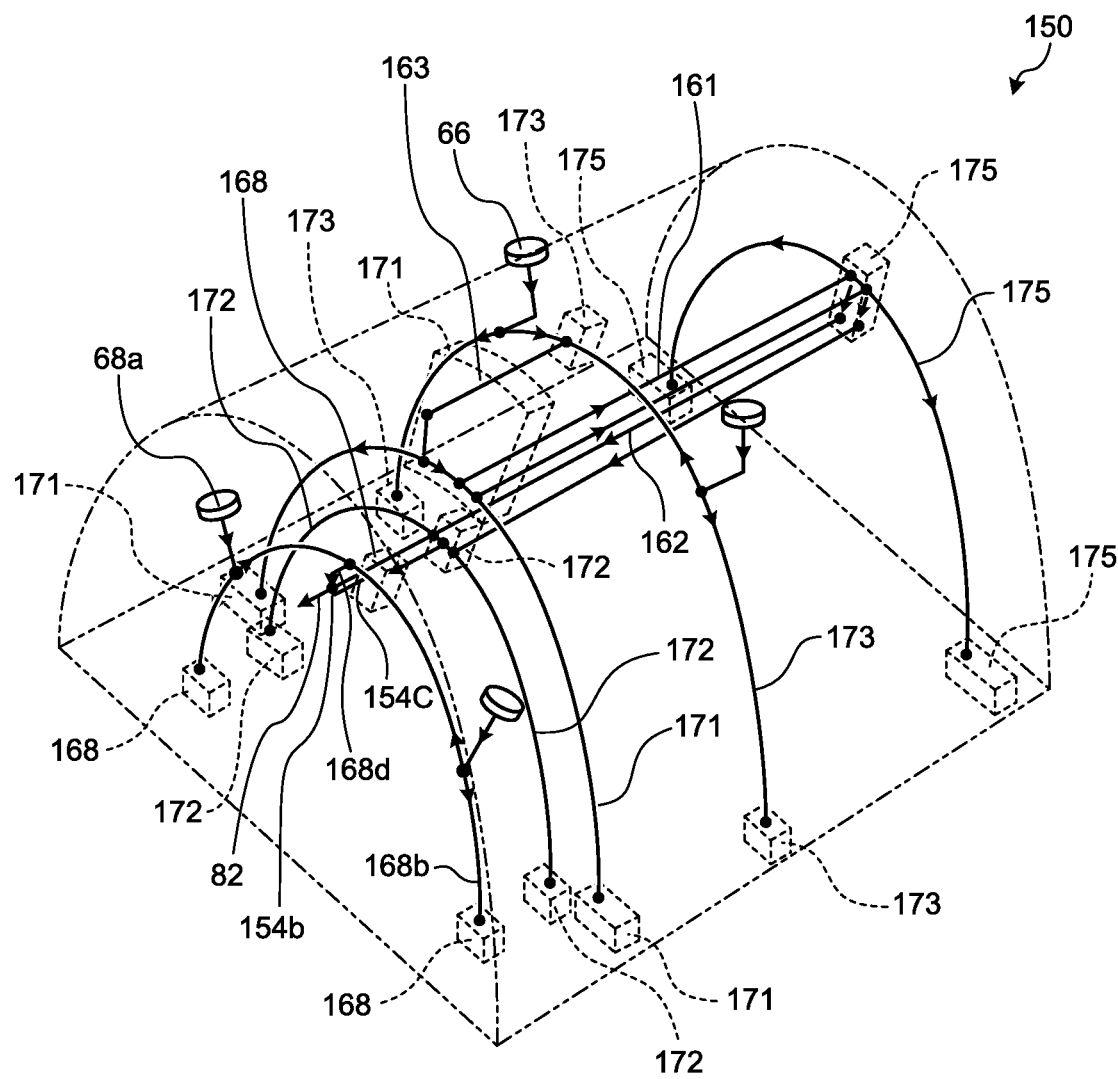
FIG. 10 is a systematic view illustrating a cooling flow passage of the blade ring part.
Figure 11:
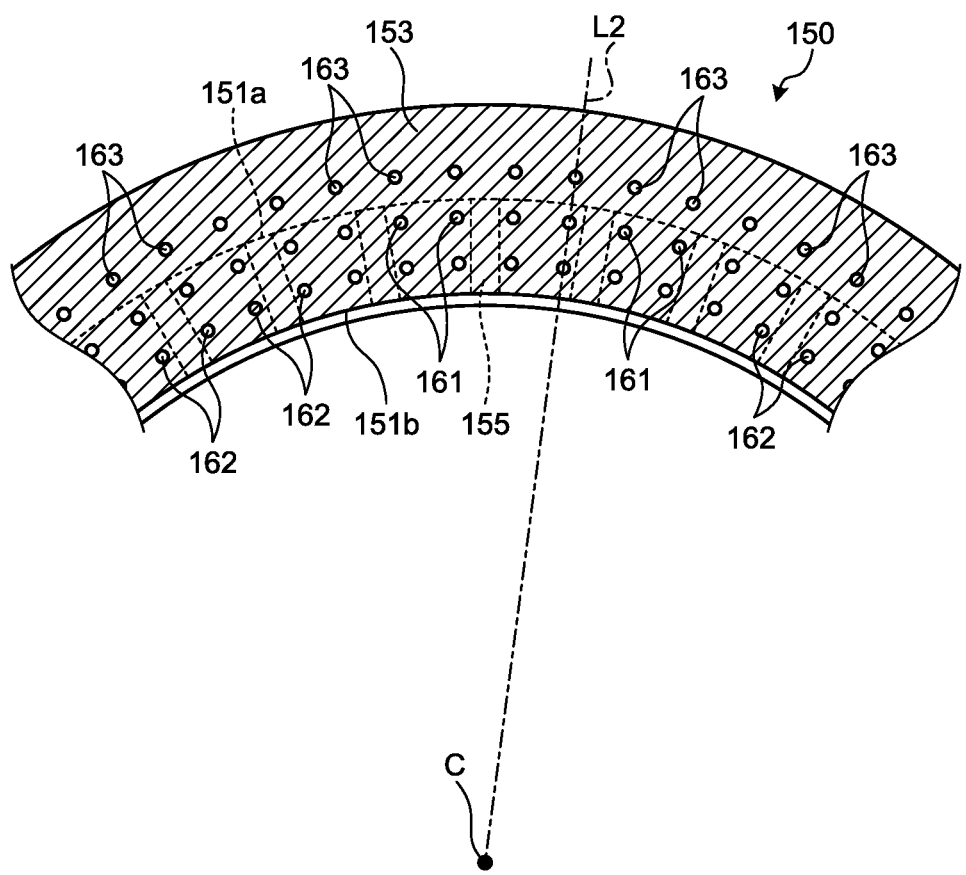
FIG. 11 is a view illustrating a shape along with a cross section along B-B in FIG. 8.

Subsequently, a second embodiment is described. FIG. 8 is a cross-sectional view illustrating an example of a part of a blade ring part 150 according to the second embodiment. FIG. 9 is a perspective view illustrating an example of the blade ring part 150 according to the present embodiment. FIG. 10 is a systematic view illustrating a cooling flow passage 160 according to the present embodiment. FIG. 11 is a view illustrating a shape along with a cross section along B-B in FIG. 9. The second embodiment differs from the first embodiment in that the cooling flow passage 160 provided at three stages in the radial direction is included for the primary purpose of enhancing the further cooling of an area on the upstream side of the intake flow passage 66 on the upstream side in the axial direction of an upstream-side inner partition part 153 and a cylindrical part 151 in a blade ring part main body 150a. In the second embodiment, differences with the first embodiment are mainly explained. Like reference signs refer to like components in the blade ring part 50 according to the first embodiment, and explanation is omitted or simplified.

As illustrated in FIG. 8, the blade ring part 150 includes the blade ring part main body 150a, a transition piece connection part 154, and a bypass flow passage 168. In addition, the blade ring part main body 150a includes the cylindrical part 151, an downstream-side inner partition part 152, and the upstream-side inner partition part 153. In the blade ring part main body 150a in the blade ring part 150 according to the present embodiment, for example, a thickness of the upstream-side inner partition part 153 in the radial direction is thicker outward in the radial direction as compared with the blade ring part main body 50a in the blade ring part 50 according to the first embodiment. In addition, the cylindrical part 151 on the inner side in the radial direction of the upstream-side inner partition part 153 has a cross section directed to the upstream side in the axial direction and thicker inward in the radial direction.

The cylindrical part 151 includes the cooling flow passage 160 and a communication flow passage 170 in which the cooling medium P flows. The cooling flow passage 160 includes a first cooling flow passage 161, a second cooling flow passage 162, and a return flow passage 165 (return communication flow passage 175) that connects the first cooling flow passage 161 with the second cooling flow passage 162. The communication flow passage 170 includes a first communication flow passage 171 and a second communication flow passage 172. The first communication flow passage 171 of the present embodiment is connected to the first cooling flow passage 161 on the inner side in the radial direction of the first communication flow passage 171, and is connected to a third cooling flow passage 163, which will be described later, on the outer side in the radial direction. Similarly to the return communication flow passage 75 of the first embodiment, the return flow passage 165 (return communication flow passage 175) may be an annular flow passage that extends in the axial rotation direction.

The present embodiment differs from the first embodiment in that the second cooling flow passage 162 includes an upstream-side flow passage 162a connected to the return flow passage 165 (return communication flow passage 175) and a downstream-side flow passage 162b connected to the second communication flow passage 172 through a flow passage opening (second opening) 151e. The upstream-side flow passage 162a linearly extends from a flow passage opening (first opening) 151d that is a connection part with the return flow passage 165 (return communication flow passage 175) to an upstream side of the axial direction while being inclined inward in the radial direction. In addition, the upstream-side flow passage 162a changes an extending direction at a Q point being a middle point and is bent outward in the radial direction so as to be bent, and is connected to the downstream-side flow passage 162b. The downstream-side flow passage 162b further extends on the upstream side in the axial direction, and is connected to the second communication flow passage 172 through the flow passage opening 151e. In other words, the second cooling flow passage 162 forms a bent flow passage that is bent outward in the radial direction at the middle point Q. In other words, the center of the flow passage opening 151d is formed on the outer side in the radial direction with respect to the center of the flow passage opening 151e. The center of the flow passage opening 151e may be formed on the inner side in the radial direction with respect to a bottom surface 165b on the inner side in the radial direction of the return flow passage 165 (return communication flow passage 175). In the cylindrical part 151, this configuration enables a flow passage to be formed more on the inside of the radial direction than the second cooling flow passage 62 of the first embodiment, and causes the cooling of the vicinity of an inner peripheral surface 151b of the cylindrical part 151 to be further enhanced.

The second cooling flow passage 162 may be a flow passage that is linearly formed from the flow passage opening 151d to the flow passage opening 151e. With this configuration, maintenance is facilitated and processing is facilitated compared to a bent flow passage.

In the present embodiment, the upstream-side inner partition part 153 of the blade ring part main body 150a further includes the third cooling flow passage 163. The third cooling flow passage 163 is disposed on the outer side in the radial direction with respect to the first cooling flow passage 161. A plurality of the third cooling flow passages 163 extend in the axial direction and are disposed aligned in the axial rotation direction. The first communication flow passage 171 also serves as a second return flow passage that connects end parts of the third cooling flow passage 163 and the first cooling flow passage 161 on the same side in the axial direction with each other. As illustrated in FIG. 11, the third cooling flow passage 163, the first cooling flow passage 161, and the second cooling flow passage 162 are disposed on a virtual straight line L2 extending from the rotation axis C in the radial direction. The third cooling flow passages 163 may be disposed evenly in the axial rotation direction on the outer side in the radial direction with respect to the first cooling flow passage 161, and are not necessarily disposed on the virtual straight line L2.

In the present embodiment, the communication flow passage 170 further includes a third communication flow passage 173. The third communication flow passage 173 communicates the third cooling flow passages 163 aligned in the axial rotation direction with each other in the axial rotation direction. The third communication flow passage 173 is provided to the inner side of the upstream-side inner partition part 153. The third communication flow passage 173 is connected to the intake flow passages 66 in which the cooling medium P is supplied. The other configuration of the cooling flow passage 160 and the communication flow passage 170 is roughly the same as that of the cooling flow passage 60 and the communication flow passage 70 in the first embodiment.

FIG. 10 illustrates the systematic view for a flow of the cooling flow passage 160 of the present embodiment. The systematic view of the present embodiment differs from the systematic view of the first embodiment in that the third cooling flow passage 163 and the third communication flow passage 173 are added to the cooling flow passage 60 of the first embodiment and the second cooling flow passage 162 has a bent shape (FIG. 8), but the other configuration of the present embodiment is the same as that of the first embodiment. FIG. 10 illustrates that the return communication flow passage 175 is disposed at an end part on the downstream side in the axial direction as a flow passage that connects the first cooling flow passage 161 and the second cooling flow passage 162 with each other. Similarly to the modification of the first embodiment illustrated in FIG. 6, the return flow passage 165 formed as a rectangular space (cavity) extending long in the radial direction may be included without providing the return communication flow passage 175.

In the present embodiment, the blade ring part 150 includes the transition piece connection part 154 on the upstream side in the axial direction of the cylindrical part 151 and at an end part of the combustor 12 side. A plurality of the transition piece connection parts 154 are disposed aligned in the axial rotation direction. Each of the transition piece connection parts 154 includes a communication hole on the transition piece side 154a that is communicated with a cooling flow passage (not illustrated) formed on the transition piece 12a side through the discharge pipe 82, a bypass connection hole 154b to which the bypass flow passage 168 (which will be described later) is connected, and a discharge flow passage 154c that collects the cooling medium P after cooling the flow passage 160 in the second communication flow passage 172 and is connected to the communication hole on the transition piece side 154a.

Similarly to the first embodiment, the bypass flow passage 168 is formed of the bypass inlet pipe 68a that receives the cooling medium P from the cooling medium circulation mechanism 80 described above, a bypass connection pipe 168b that is annularly disposed in the axial rotation direction on the upstream side in the axial direction of the cylindrical part 151 and supplies the cooling medium P to the transition piece connection part 154, a thermal expansion absorbing unit 168c that absorbs thermal expansion of the bypass connection pipe 168b, and an inlet connection pipe 168d that couples the bypass connection pipe 168b with the bypass connection hole 154b formed on the transition piece connection part 154. The bypass connection pipe 168b is disposed apart from a side surface 153e at the upstream end in the axial direction of the upstream-side inner partition part 153, in the axial direction. Thus, there is no possibility that a flow of the cooling medium P flowing in the bypass flow passage 168 affects temperature distribution of the blade ring part main body 150a. The detailed configuration of the bypass flow passage is the same as that of the first embodiment, and the detailed explanation is omitted.

The following describes a manufacturing process of the blade ring part 150 of the present embodiment. The blade ring part main body 150a is produced by casting, sheet-metal working, or the like. In this process, in the cylindrical part 151 and the upstream-side inner partition part 153 forming the blade ring part main body 150a, the communication flow passage 170 disposed at the end of the axial direction to which each cooling flow passage 160 is connected is formed by mechanical processing. In other words, an annular groove extending in the axial rotation direction that forms the first communication flow passage 171 and the second communication flow passage 172, and the return flow passage (return communication flow passage 175) is processed. The annular groove is formed in a groove shape that is recessed from the upstream end in the axial direction or the downstream end in the axial direction of the cylindrical part 151 to the downstream side or the upstream side in the axial direction by mechanical processing. In addition, an annular groove extending in the axial rotation direction that forms the third communication flow passage 173 is formed at a partition groove 153a of the upstream-side inner partition part 153 by mechanical processing. A groove of the third communication flow passage 173 is formed as a recessed part that is recessed from a bottom surface 153c to the inner side in the radial direction along with the axial rotation direction of the partition groove 153a. Subsequently, the first cooling flow passage 161 and the third communication flow passage 173 are formed by mechanical processing using punching. The first cooling flow passage 161 is punched from the first communication flow passage 171 side toward the return flow passage 165 (return communication flow passage 175) side. The third cooling flow passage 163 is punched from the first communication flow passage 171 side toward the third communication flow passage 173 side. Subsequently, the second cooling flow passage 162 is formed by mechanical processing using two-stage punching. In other words, in FIG. 8, at a first stage, the second cooling flow passage 162a is formed by mechanical processing using punching from the return flow passage 165 or the return communication flow passage 175 toward the Q point on the upstream side in the axial direction. Subsequently, at a second stage, punching processing is applied from the second communication flow passage 172 side toward the Q point on the downstream side in the axial direction by mechanical processing. When reaching the Q point, the second cooling flow passages 162a and 162b are integrated so as to form a whole flow passage of the second cooling flow passage 162. Subsequently, a first plugging member (lid plate 171a) and a second plugging member (transition piece connection part 154), and a lid plate 173a, a lid plate 165a, or a lid plate 175a are mounted on the blade ring part main body 150a by welding processing so as to form the first communication flow passage 171 and the second communication flow passage 172, and the return flow passage 165 or the return communication flow passage 175 that are closed flow passages. Subsequently, the bypass flow passage 168 is mounted on the transition piece connection part 154 fixed to the blade ring part main body 150a. Through this manufacturing process, assembly of the blade ring part 150 is completed.

As above, in the blade ring part 150 according to the present embodiment, a plurality of the cooling flow passages 160 aligned in the axial rotation direction can be disposed at three stages or more in the radial direction, thereby efficiently cooling the blade ring part 150 over the radial direction. Thus, temperature distribution can be efficiently prevented from being formed in the radial direction of the blade ring part 150.

Upon start-up of the gas turbine 100, the blade ring part 150 according to the present embodiment enables the cooling medium P to bypass the blade ring part main body 150a and to efficiently flow into the transition piece 12a side through the bypass flow passage 168. Thus, the blade ring part 150 can operate without affecting temperature distribution of the blade ring part main body 150a, and a start-up time of the gas turbine 100 can be shortened. The bypass connection pipe 168b includes the thermal expansion absorbing unit 168c, and thermal stress generated in the bypass connection pipe 168b can be reduced.

Third Embodiment

Figure 12:
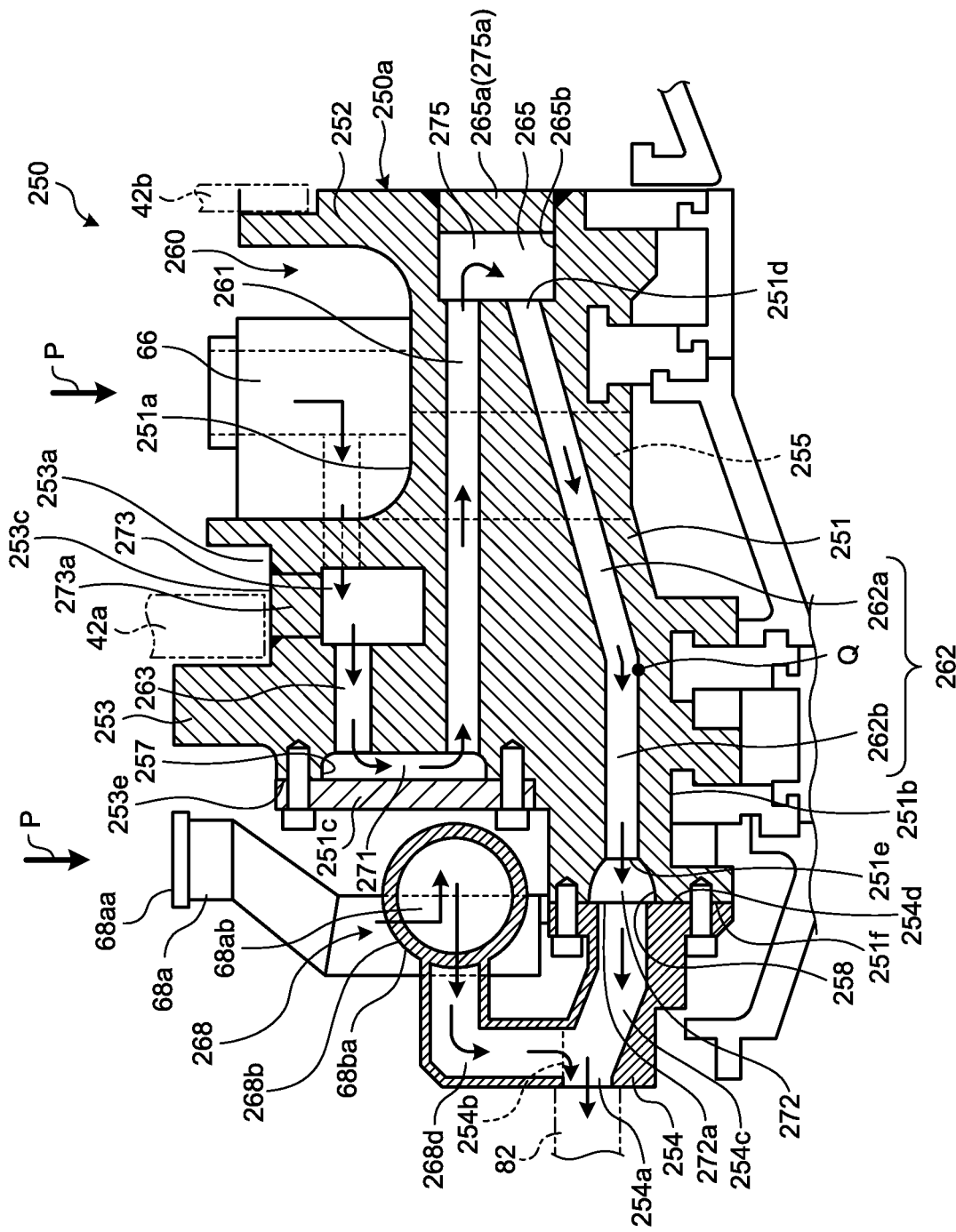
FIG. 12 is a cross-sectional view illustrating an example of a blade ring part according to a third embodiment.
Figure 13:
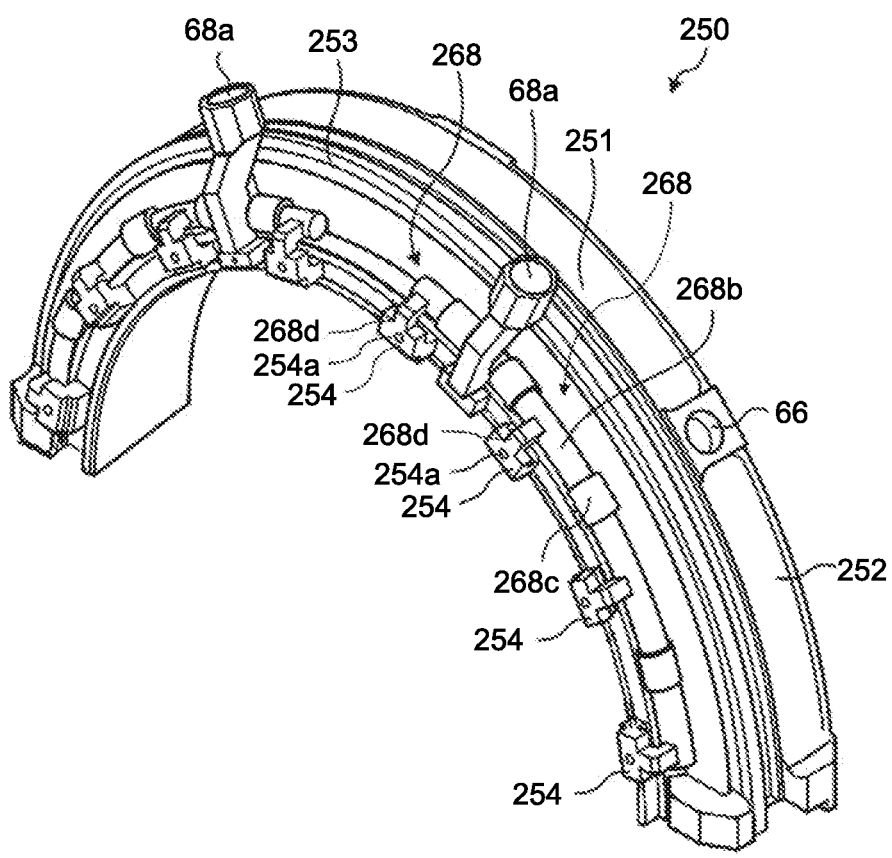
FIG. 13 is a perspective view illustrating an example of a part of the blade ring part.

Subsequently, a third embodiment is described. FIG. 12 is a cross-sectional view illustrating an example of a part of a blade ring part 250 according to the third embodiment. FIG. 13 is a perspective view illustrating an example of the blade ring part 250. In the third embodiment, the third embodiment differs from the second embodiment in a part of the configuration of the blade ring part 250, and differences with the second embodiment are mainly explained. Like reference signs refer to like components in the blade ring part 150 according to the second embodiment, and explanation is omitted or simplified.

As illustrated in FIGS. 12 and 13, the blade ring part 250 according to the present embodiment includes a blade ring part main body 250a, a transition piece connection part 254 (second plugging member), and a bypass flow passage 268. In addition, the blade ring part main body 250a includes a cylindrical part 251, an downstream-side inner partition part 252, an upstream-side inner partition part 253, and a first plugging member 251c. In the present embodiment, with respect to cylindrical part 251 or the upstream-side inner partition part 253 in the blade ring part main body 250a, the plugging member 251c is attachably and detachably fixed from the upstream side in the axial direction at a position corresponding to a first communication flow passage 271 by a fixed member BT such as bolts. The transition piece connection part 254 (second plugging member) is connected to an end part of the cylindrical part 251 projecting on the upstream side in the axial direction, but the connection with the cylindrical part 251 is, similarly to the plugging member 251c, attachably and detachably made from the upstream side in the axial direction by a fixed member BT such as bolts.

Similarly to the second embodiment, a cooling flow passage 260 of the blade ring part main body 250a includes a first cooling flow passage 261, a second cooling flow passage 262, a third cooling flow passage 263, and a return flow passage 265 (return communication flow passage 275). In the present embodiment, similarly to the second embodiment, the second cooling flow passage 262 includes an upstream-side flow passage 262a connected to the return flow passage 265 (return communication flow passage 275) and a downstream-side flow passage 262b connected to a second communication flow passage 272 through a flow passage opening (second opening) 251e. The upstream-side flow passage 262a linearly extends from a flow passage opening (first opening) 251d that is a connection part with the return flow passage 265 (return communication flow passage 275) to the upstream side in the axial direction while being inclined inward in the radial direction. In addition, the upstream-side flow passage 262a changes an extending direction at a Q point being a middle point and is bent outward in the radial direction so as to be bent, and is connected to the downstream-side flow passage 262b. The downstream-side flow passage 262b further extends on the upstream side in the axial direction, and is connected to the second communication flow passage 272 through the flow passage opening 251e. In other words, the second cooling flow passage 262 forms a bent flow passage that is bent outward in the radial direction at the middle point Q. In other words, the center of the flow passage opening 251d is formed on the outer side in the radial direction with respect to the center of the flow passage opening 251e. The center of the flow passage opening 251e may be formed on the inner side in the radial direction with respect to a bottom surface 265b on the inner side in the radial direction of the return flow passage 265 (return communication flow passage 275). In the cylindrical part 251, this configuration enables a flow passage to be formed more on the inner side in the radial direction than the second cooling flow passage 62 of the first embodiment, and causes the cooling of the vicinity of an inner peripheral surface 251b of the cylindrical part 251 to be further enhanced. In addition, the second cooling flow passage 262 may be a flow passage that is linearly formed from the flow passage opening 251d to the flow passage opening 251e. With this configuration, maintenance is facilitated and processing is facilitated compared to a bent flow passage. Furthermore, a communication flow passage 270 of the blade ring part main body 250a includes the first communication flow passage 271, the second communication flow passage 272, and a third communication flow passage 273.

The first communication flow passage 271 of the blade ring part main body 250 is formed in an annular groove-like shape in the axial rotation direction as a first groove 257 that is open to the upstream side in the axial direction at an end part 253e on the upstream side in the axial direction of the cylindrical part 251 or the upstream-side inner partition part 253. The second communication flow passage 272 is formed in an annular groove-like shape in the axial rotation direction as a second groove 258 that is open to the upstream side in the axial direction, on an main body upstream-side end surface 251f that is an end part of the upstream side in the axial direction of the cylindrical part 251. The first groove 257 is plugged by the first plugging member 251c, and forms the annular first communication flow passage 271 with the first groove 257. Similarly, the second groove 258 is plugged by the transition piece connection part 254 (second plugging member), and forms the annular second communication flow passage 272 with the second groove 258.

The configuration of the transition piece connection part 254 and the bypass flow passage 268 of the present embodiment is the same as that of the second embodiment. Because the transition piece connection part 254 has the attachable/detachable configuration, the bypass flow passage 268 connected to the transition piece connection part 254 also has the attachable/detachable configuration. In other words, the bypass inlet pipe 68a, a bypass connection pipe 268b, a thermal expansion absorbing unit 268c, and an inlet connection pipe 268d that form the bypass flow passage 268 also have easily disassembled configuration and attachable/detachable configuration. The bypass connection pipe 268b is disposed apart from the side surface 253e at the upstream end in the axial direction of the upstream-side inner partition part 253 in the axial direction. Thus, there is no possibility that a flow of the cooling medium P flowing in the bypass flow passage 268 affects temperature distribution of the blade ring part main body 250a. The other configuration is the same as that of the second embodiment.

FIG. 14 illustrates a flowchart illustrating a manufacturing process of the blade ring part according to the present embodiment. The blade ring part main body 250a is manufactured by casting or sheet-metal working, or the like (S1). In this process, in the cylindrical part 251 and the upstream-side inner partition part 253 forming the blade ring part main body 250a, the communication flow passage 270 disposed at the end of the axial direction to which each cooling flow passage 260 is connected is formed by mechanical processing. Specifically, the first groove 257 that forms the first communication flow passage 271 and the second groove 258 that forms the second communication flow passage 272 are formed by mechanical processing. The first groove 257 and the second groove 258 are recessed parts that are recessed from the side surface 253e that is the upstream end in the axial direction of the upstream-side inner partition part 253 or the main body upstream-side end surface 251f at the upstream end of the axial direction of the cylindrical part 251 to the downstream side in the axial direction, and are formed in an annular groove-like shape extending in the axial rotation direction by mechanical processing. The third communication flow passage 273 is a recessed part that is recessed from a bottom surface 253c of a partition groove 253a on the outer surface side in the radial direction of the upstream-side inner partition part 253 to the inner side in the radial direction, and is formed in an annular groove-like shape extending in the axial rotation direction by mechanical processing. The return flow passage 265 or the return communication flow passage 275 is a recessed part that is recessed from an outer surface side of the end surface on the downstream side in the axial direction of the cylindrical part 251 to the upstream side in the axial direction, and is formed as an annular groove extending in the axial rotation direction by mechanical processing.

Subsequently, the first cooling flow passage 261 and the third cooling flow passage 263 are formed by mechanical processing using drilling (S2). The first cooling flow passage 261 is drilled from the first groove 257 side toward the return communication flow passage 275 side. The third cooling flow passage 263 is drilled from the first groove 271 side toward the third communication flow passage 273 side. The intake flow passage 66 formed on the downstream side in the axial direction of the upstream-side inner partition part 253 is formed by drilling from the downstream-side inner partition part 252 side toward the third communication flow passage 273.

Subsequently, the second cooling flow passage 262 is formed by mechanical processing using two-stage drilling (S3). In other words, in FIG. 12, at a first stage, the second cooling flow passage 262a is formed from the return flow passage 265 or the return communication flow passage 275 toward the Q point on the upstream side in the axial direction by mechanical processing using drilling. Subsequently, at a second stage, drilling processing is applied from the second groove 258 side toward the Q point on the downstream side in the axial direction. When reaching the Q point, the second cooling flow passages 262a and 262b are integrated so as to form a whole flow passage of the second cooling flow passage 262. At this stage, a cavity (communication flow passage) that connects each cooling flow passage 260 with each cooling flow passage 260 is formed.

Subsequently, the first plugging member 251c is mounted on the first groove 257 so as to form the first communication flow passage 271 (S4). In other words, the first plugging member 251c is attachably and detachably fastened by a bolt at a position of the first groove 257 forming the first communication flow passage 271 so as to plug the first groove 257. In addition, lid plates 273a, 265a, 275a, and the like of the cavity forming each of the communication flow passages are mounted on the blade ring part main body 250a by welding processing. In this manner, a set of the closed passages with the first communication flow passage 271 and third communication flow passage 273, and the return communication flow passage 275 are formed.

Subsequently, the second plugging member (transition piece connection part 254) is mounted on the second groove 258 so as to form the second communication flow passage 272 (S5). In other words, the transition piece connection part 254 is attachably and detachably fastened by a bolt at a position of the second groove 258 formed on the cylindrical part 251 of the blade ring part main body 250a so as to plug the second groove 258. In this manner, the closed second communication flow passage 272 is formed.

Subsequently, the bypass flow passage 268 is mounted on the transition piece connection part 254 fixed to the blade ring part main body 250a. Through this manufacturing process, assembly of the blade ring part 250 is completed.

In the blade ring part 250 of the present embodiment, the first groove 257 and the second groove 258 are easily released by removing the attachably and detachably mounted transition piece connection part 254 (second plugging member) and bypass flow passage 268, and the first plugging member 251c. This manner enables internal inspection of the first cooling flow passage 261 and the third cooling flow passage 263 to be made from the first communication flow passage 271 side. This manner also enables internal inspection of the second cooling flow passage 262 to be made from the second communication flow passage 272 side. In other words, the first and second plugging members have the attachable/detachable configuration. Thus, upon maintenance of the gas turbine, the internal inspection of the whole cooling flow passage 260 (the first cooling flow passage 261, the second cooling flow passage 262, and the third cooling flow passage 263) is easily made.

In this manner, in the present invention, the blade ring part main body 250a can be easily formed by fastening the transition piece connection part 254 (second plugging member) and the first plugging member 251c to the blade ring part main body 250a. Upon maintenance and the like of the gas turbine, the first groove 257 and the second groove 258 can be easily exposed to the outer side by removing the transition piece connection part 254 and the bypass flow passage 268, and the first plugging member 251c from the blade ring part main body 250a. Thus, the internal inspection of the whole cooling flow passages 260 (first cooling flow passage 261, the second cooling flow passage 262, and the third cooling flow passage 263) can be made, and maintenance operation is facilitated.

REFERENCE SIGNS LIST

11 Compressor
12 Combustor

12a Transition piece
13 Turbine
14 Casing chamber
20 Air intake chamber
21 Compressor casing chamber
22 Inlet guide vane
23, 27 Vane
24, 28 Blade
25 Air bleed chamber
26 Turbine casing chamber
29 Exhaust casing chamber
30 Exhaust chamber
31 Exhaust diffuser
32 Rotor
33, 34 Bearing
35, 36, 37 Leg part
42a Upstream-side outer partition part
42b Downstream-side outer partition part
50, 150, 250 Blade ring part
50a, 150a, 250a Blade ring part main body
51, 151, 251 Cylindrical part
51a, 151a, 251a Outer peripheral surface of cylindrical part
51b, 151b, 251b Inner peripheral surface of cylindrical part
51d, 151d, 251d Flow passage opening (first opening)
51e, 151e, 251e Flow passage opening (second opening)
52, 152, 252 Downstream-side inner partition part
53, 153, 253 Upstream-side inner partition part
54, 154, 254 Transition piece connection part
54a, 154a, 254a Communication hole on transition piece side
54b, 154b, 254b Bypass connection hole
54c, 154c, 254c Discharge flow passage (second plugging member)
55, 155, 255 Cavity supply flow passage
60, 160, 260 Cooling flow passage
61, 161, 261 First cooling flow passage
62, 162, 262 Second cooling flow passage
65, 165, 265 Return flow passage
65b, 165b, 265b Bottom surface
66 Intake flow passage
68, 168, 268 Bypass flow passage
68a Bypass inlet pipe
68b, 168b, 268b Bypass connection pipe
68c, 168c, 268c Thermal expansion absorbing unit
68d, 168d, 268d Inlet connection pipe
70, 170, 270 Communication flow passage
71, 171, 271 First communication flow passage
72, 172, 272 Second communication flow passage
75, 175, 275 Return communication flow passage
80 Cooling medium circulation mechanism
81 Supply pipe
82 Discharge pipe
83 Bypass pipe
84 Air-cooler
85 Compressor
86 Three-way valve
100 Gas turbine
162a, 262a Upstream-side flow passage
162b, 262b Downstream-side flow passage
163, 263 Third cooling flow passage
173 Third communication flow passage
251c First plugging member
257 First groove
258 Second groove
C Rotation axis
G Combustion gas
L1, L2 Virtual straight line
P Cooling medium

The invention claimed is:

1. A gas turbine comprising:
a compressor compressing air;
a combustor mixing a fuel with the compressed air compressed by the compressor and combusts the compressed air mixed with the fuel;
a turbine being rotated by combustion gas generated by the combustor;
a rotor including a rotor main body rotating in an axial rotation direction of a rotation axis by rotation of the turbine, and a plurality of blade stages aligned in an axial direction of the rotation axis and fixed to the rotor main body;
a casing covering an outer peripheral side of the rotor;
a plurality of vane stages being fixed to an inner peripheral side of the casing and being disposed on the respective upstream sides of the blade stages; and
a plurality of blade ring parts being provided to the casing, being annularly formed centering on the rotation axis, and covering the blade stages and the vane stages,
each of the blade ring parts including:
a plurality of first cooling flow passages being disposed within the blade ring part, extending in the axial direction, and being disposed aligned in the axial rotation direction;
a plurality of second cooling flow passages being disposed within the blade ring part and radially inward of the first cooling flow passages, the plurality of second cooling flow passages extending in the axial direction, and being disposed aligned in the axial rotation direction;
a first return flow passage connecting end parts of each of the first cooling flow passages and the second cooling flow passages on a same side in the axial direction with each other;
a plurality of third cooling flow passages being disposed within the blade ring part and radially outward of the first cooling flow passages, the plurality of third cooling flow passages extending in the axial direction, and being disposed aligned in the axial rotation direction; and
a second return flow passage connecting end parts of the third cooling flow passages and the first cooling flow passages on a same side in the axial direction with each other.

2. The gas turbine according to claim 1, wherein
the first cooling flow passages and the second cooling flow passages are formed in a blade ring part main body, and
the second cooling flow passages are connected to the first return flow passage at a first opening and are opened to an end part of the blade ring part main body on an upstream side in the axial direction at a second opening, and
a center of the first opening is disposed farther from the rotation axis than the second opening in the radial direction.

3. The gas turbine according to claim 2, wherein the center of the second opening is disposed closer to the rotation axis than a bottom surface of the first return flow passage.

4. The gas turbine according to claim 2, wherein the second cooling flow passages are bent flow passages that are bent outward in the radial direction at a middle point of the flow passages extending in the axial direction.

5. The gas turbine according to claim 1, wherein for each of the blade ring parts, the second return flow passages serves as a first communication flow passage that communicates the first cooling flow passages with each other in the axial rotation direction, and wherein each of the blade ring parts includes a second communication flow passage that communicates the second cooling flow passages with each other in the axial rotation direction.

6. The gas turbine according to claim 5, wherein
the first communication flow passage is connected to a supply pipe where a cooling medium is supplied, and
the second communication flow passage is connected to a discharge pipe where the cooling medium is discharged.

7. The gas turbine according to claim 6, wherein the discharge pipe is connected to a cooling flow passage of the combustor.

8. The gas turbine according to claim 7, further comprising:
a bypass flow passage bypassing the blade ring parts and connecting the supply pipe with the discharge pipe; and
a supply destination switching unit switching a supply destination of the cooling medium between the blade ring parts and the bypass flow passage.

9. The gas turbine according to claim 8, wherein the bypass flow passage is disposed apart from a blade ring part main body in the axial direction.

10. The gas turbine according to claim 8, wherein
the combustor includes a transition piece on the turbine side,
each of the blade ring parts includes a plurality of transition piece connection units that are disposed aligned in the axial rotation direction, and
each of the transition piece connection units includes a bypass connection hole that is communicated with the bypass flow passage and a communication hole on a transition piece side.

11. The gas turbine according to claim 10, wherein the bypass flow passage includes a bypass connection pipe that is annularly disposed along an outer surface of the blade ring parts.

12. The gas turbine according to claim 11, wherein the bypass connection pipe includes a thermal expansion absorbing unit capable of being deformed depending on thermal deformation of the blade ring parts.

13. The gas turbine according to claim 10, wherein each of the blade ring parts includes
a blade ring part main body provided with the first cooling flow passages, the second cooling flow passages, the first return flow passage, a first groove that is a part of the first communication flow passage, and a second groove that is a part of the second communication flow passage,
a first plugging member being attachably and detachably fastened to the blade ring part main body, and plugging the first groove so as to form the first communication flow passage with the first groove, and
the transition piece connection units being attachably and detachably fastened to the blade ring part main body, and plugging the second groove so as to form the second communication flow passage with the second groove.

14. The gas turbine according to claim 5, wherein
each of the blade ring parts includes a partition part that projects outward in the radial direction, and the first communication flow passage is disposed on the partition part.

15. The gas turbine according to claim 1, wherein for each of the blade ring parts, the first return flow passage is one of a plurality of first return flow passages communicated with each other in the axial rotation direction.

16. The gas turbine according to claim 1, wherein the first cooling flow passages and the second cooling flow passages are disposed on a virtual straight line extending from the rotation axis in the radial direction.

17. The gas turbine according to claim 1, wherein each of the blade ring parts includes a cavity supply flow passage that passes through the radial direction, and the first cooling flow passages and the second cooling flow passages each are disposed at a position depending on a location of the cavity supply flow passage.

18. A method for manufacturing a plurality of blade ring parts that are provided to a gas turbine, the gas turbine comprising
a compressor compressing air,
a combustor mixing a fuel with the compressed air compressed by the compressor and combusts the compressed air mixed with the fuel,
a turbine being rotated by combustion gas generated by the combustor,
a rotor including a rotor main body rotating in an axial rotation direction of a rotation axis by rotation of the turbine, and a plurality of blade stages aligned in an axial direction of the rotation axis and fixed to the rotor main body,
a cylindrical casing covering an outer peripheral side of the rotor, and
a plurality of vane stages being fixed to an inner peripheral side of the casing and being disposed on the respective upstream sides of the blade stages,
wherein the plurality of blade ring parts are provided to the casing, are annularly formed centering on the rotation axis of the rotor, and cover the blade stages and the vane stages, the method comprising:
for each of the blade ring parts, forming a blade ring part main body that includes
a plurality of first cooling flow passages which extend in the axial direction, and which are aligned in the axial rotation direction,
a plurality of second cooling flow passages disposed radially inward of the first cooling flow passages, the second cooling flow passages extending in the axial direction and being aligned in the axial rotation direction,
a plurality of third cooling flow passages disposed radially outward of the first cooling flow passages, the third cooling flow passages extending in the axial direction and being aligned in the axial rotation direction,
a first return flow passage which connects end parts of each of the first cooling flow passages and the second cooling flow passages on a same side in the axial direction with each other,
a first communication flow passage which communicates the first cooling flow passages with each other in the axial rotation direction, and which serves as a second return flow passage connecting end parts of the third cooling flow passages and the first cooling flow passages on a same side in the axial direction with each other, a second communication flow passage which communicates the second cooling flow passages with each other in the axial rotation direction, and a third communication flow passage which communicates the third cooling flow passages with each other in the axial rotation direction;

forming the first cooling flow passages between the first communication flow passage and the return flow passage;

forming the second cooling flow passages between the second communication flow passage and the return flow passage in two stages;

forming the third cooling flow passages between the third communication flow passage and the first communication flow passage;

mounting a first plugging member that plugs the first communication flow passage on the blade ring parts so as to form the first communication flow passage; and mounting a second plugging member that plugs the second communication flow passage on the blade ring parts.

* * * * *